United States Patent
Jiang et al.

(10) Patent No.: US 11,528,050 B1
(45) Date of Patent: Dec. 13, 2022

(54) TRANSMITTER AND RECEIVER FOR MIRROR CROSSTALK EVALUATION AND METHODS THEREFOR

(71) Applicant: HUAWEI TECHNOLOGIES CO., LTD., Guangdong (CN)

(72) Inventors: Zhiping Jiang, Kanata (CA); Xuefeng Tang, Kanata (CA); Junho Chang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/518,928

(22) Filed: Nov. 4, 2021

(51) Int. Cl.
| | |
|---|---|
| H04B 1/44 | (2006.01) |
| H04B 1/10 | (2006.01) |
| H04B 1/04 | (2006.01) |
| H04B 1/54 | (2006.01) |
| H04B 1/16 | (2006.01) |

(52) U.S. Cl.
CPC .............. H04B 1/54 (2013.01); H04B 1/109 (2013.01); H04B 1/1027 (2013.01); H04B 1/1607 (2013.01)

(58) Field of Classification Search
CPC ... H04B 1/02; H04B 1/04; H04B 1/06; H04B 1/10; H04B 1/16; H04B 1/1027; H04B 1/109; H04B 1/1607; H04B 1/38; H04B 1/40; H04B 1/44; H04B 1/54; H04B 10/516; H04B 10/5162; H04B 10/61
See application file for complete search history.

(56) References Cited

U.S. PATENT DOCUMENTS

| | | | | |
|---|---|---|---|---|
| 5,289,474 | A * | 2/1994 | Purcell | H04L 43/50 370/249 |
| 8,503,926 | B2 * | 8/2013 | Gainey | H04B 7/15585 455/7 |
| 10,983,344 | B2 * | 4/2021 | Brown | H04N 13/344 |
| 11,118,962 | B2 * | 9/2021 | Engler | G01J 1/0403 |
| 11,265,083 | B2 * | 3/2022 | Maes | H04B 10/61 |
| 2005/0144341 | A1 * | 6/2005 | Schmidt | G06F 5/14 710/52 |

FOREIGN PATENT DOCUMENTS

WO    WO-2018027165 A1 *  2/2018

* cited by examiner

*Primary Examiner* — Quochien B Vuong
(74) *Attorney, Agent, or Firm* — BCF LLP

(57) ABSTRACT

The disclosed systems and methods for detecting mirror crosstalk between frequency bands equally above and below the center frequency of a Digital Subcarrier Multiplexing system include: a transmitter configured to insert zero-power symbols on half the frequency bands below center frequency, and insert other zero-power symbols, partially overlapping in time with the first zero-power symbols, on the other half of the frequency bands above center frequency. A receiver zeroes out ASE and other noises during the overlapping portion of all the zero-power symbols, then uses the power detected during the remaining portion of each zero-power symbol in each frequency band to accurately evaluate the mirror crosstalk from the corresponding frequency band on the opposite side of center frequency.

24 Claims, 19 Drawing Sheets

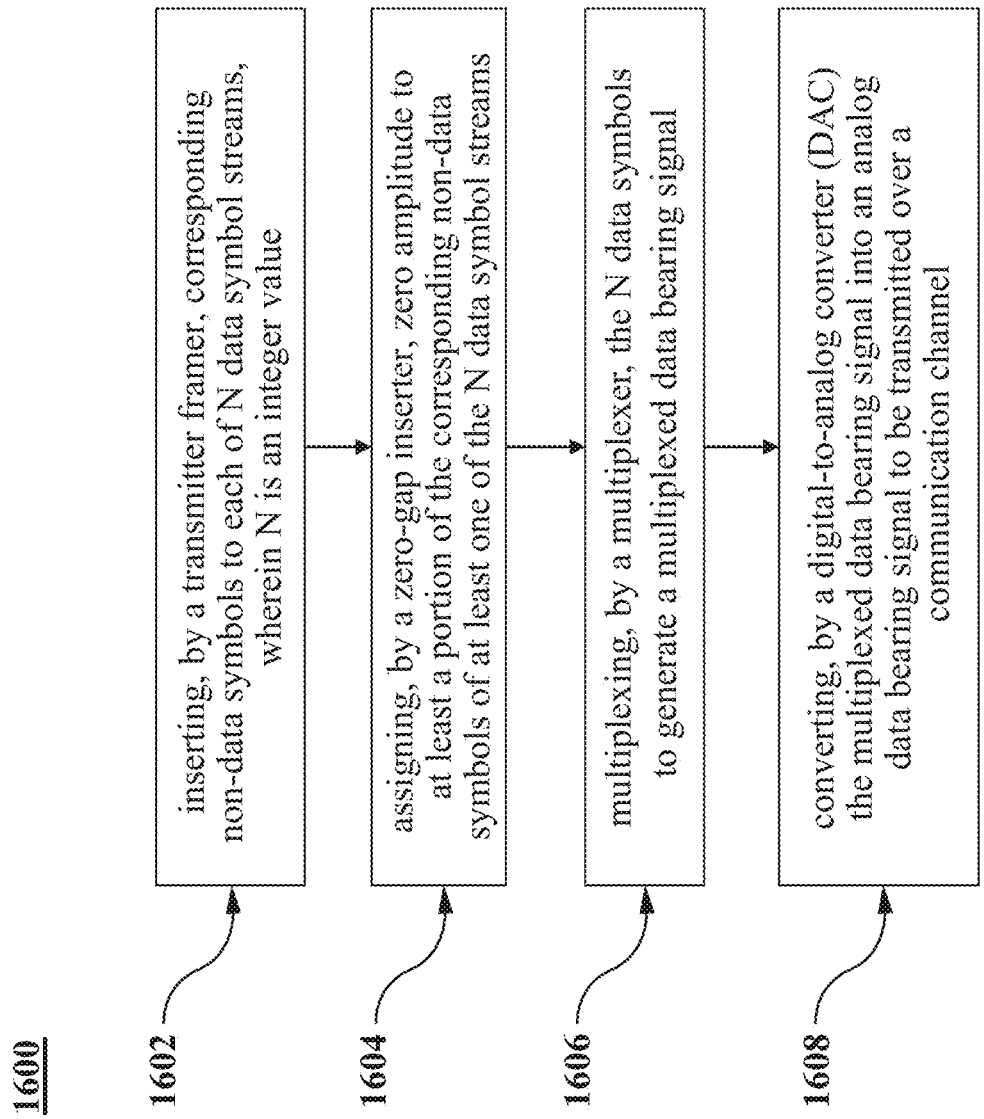

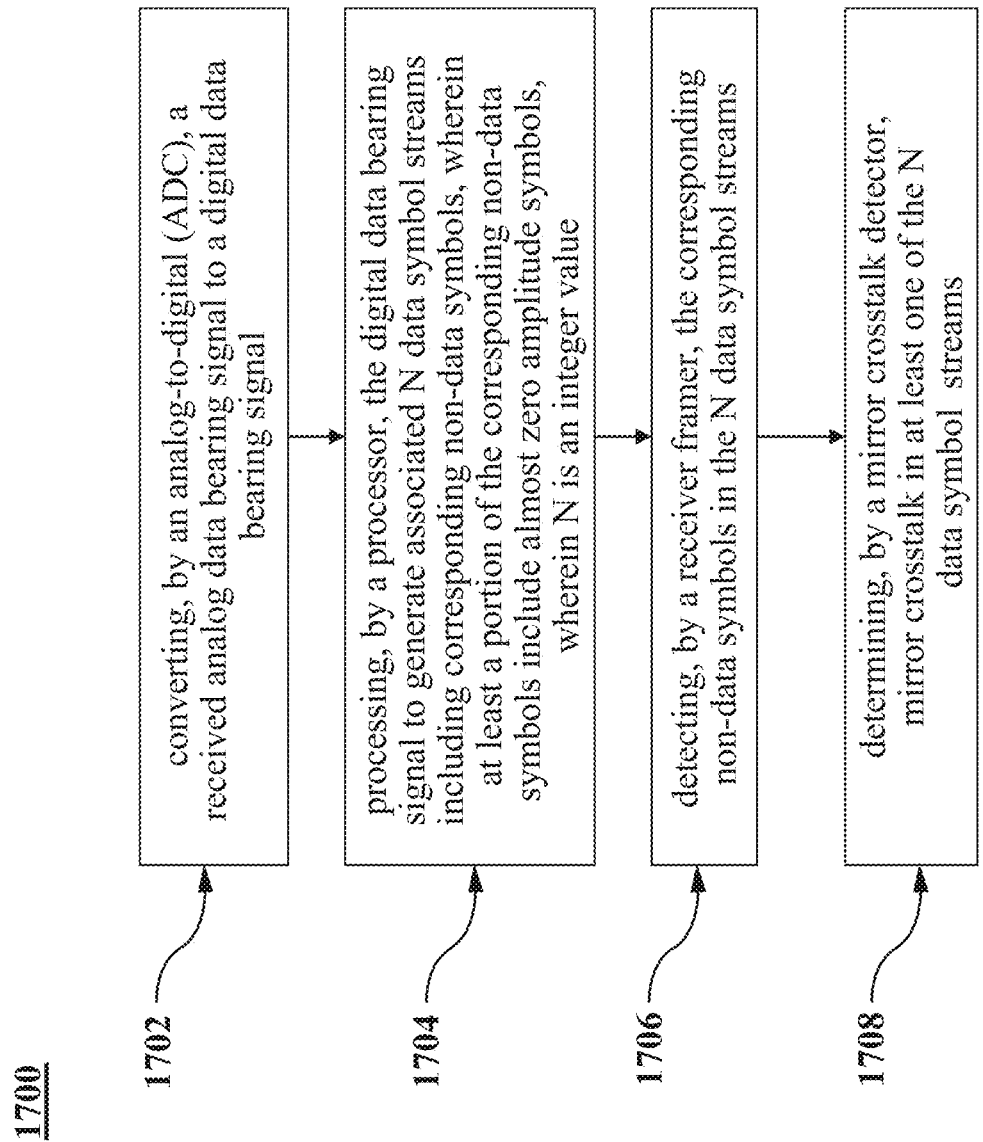

TRANSMITTER AND RECEIVER FOR MIRROR CROSSTALK EVALUATION AND METHODS THEREFOR

CROSS-REFERENCE TO RELATED APPLICATIONS

This is the first application filed for the instantly disclosed technology.

TECHNICAL FIELD

The present disclosure generally relates to communications and, in particular, to Transmitter and receiver for mirror crosstalk evaluation and methods therefor.

BACKGROUND

In the field of optical communication, as compared to single carrier modulation scheme, digital subcarrier multiplexing (DSCM) has been recognized as a promising solution for high spectral efficiency transmission beyond 800 Gb/s due to its advantages of flexible baud rate feasibility, higher equalization enhanced phase noise (EEPN) tolerance, lower fiber Kerr nonlinear penalty. DSCM has been successfully implemented in ASIC chips and its performance has been demonstrated over data center interconnect (DCI) and long-haul systems.

In comparison to single carrier modulation scheme, the hardware impairment for a DSCM has a strong dependency on the spectral frequency. In particular, a sub-carrier allocated at the signal spectral edges normally suffers from a higher degradation due to hardware impairments. Further, any imbalance between In-phase (I) and Quadrature (Q) data channels will cause an image at the opposite frequency with respect to the original subcarrier center. This mirror image at the opposite frequency causes crosstalk between tone pairs and degrades the performance significantly.

To this end, there is an interest in developing an efficient system and method for monitoring mirror crosstalk that can assist in performing a real-time suppression to the mirror image.

SUMMARY

The embodiments of the present disclosure have been developed based on developers' appreciation of the limitations associated with the prior art, namely efficiently monitoring crosstalk.

Various conventional techniques to monitor crosstalk relies of crosstalk monitoring by an optical spectrum analyzer (OSA). The crosstalk monitoring is typically performed by turning off one of the pair of subcarriers for substantial amount of time and directly measuring the optical power leaked from the subcarrier at the opposite side with respect to the center frequency. The major drawback of such techniques is that these conventional techniques may not be used for online monitoring technique. Because the data needs to be blocked for a substantially long time in order to identify the power level using OSA, these techniques inherently interrupt the data transmission.

Instead of using optical spectrum in the frequency domain and turning off subcarriers for significant amount of time resulting in a block of real-time data traffic, various embodiments of the present disclosure exploit pre-defined zero-power gaps (or symbols) in the time domain for the monitoring of mirror crosstalk. As opposed to the prior art, techniques of the present disclosure may monitor the mirror crosstalk without blocking the real-time data traffic.

The disclosed systems and methods for detecting mirror crosstalk between frequency bands equally above and below the center frequency of a Digital Subcarrier Multiplexing system include: a transmitter configured to insert zero-power symbols on half the frequency bands below center frequency, and insert other zero-power symbols, partially overlapping in time with the first zero-power symbols, on the other half of the frequency bands above center frequency. A receiver zeroes out ASE and other noises during the overlapping portion of all the zero-power symbols, then uses the power detected during the remaining portion of each zero-power symbol in each frequency band to accurately evaluate the mirror crosstalk from the corresponding frequency band on the opposite side of center frequency.

In accordance with a first broad aspect of the present disclosure, there is provided transmitter comprising: a transmitter framer configured to insert corresponding non-data symbols to each of N data symbol streams, wherein N is an integer value; a zero-gap inserter configured to assign zero amplitude to at least a portion of the corresponding non-data symbols of at least one of the N data symbol streams; a multiplexer configured to multiplex the N data symbols and generate a multiplexed data bearing signal; and a digital-to-analog converter (DAC) configured to convert the multiplexed data bearing signal into an analog data bearing signal to be transmitted over a communication channel In accordance with any embodiments of the present disclosure, transmitter of claim 1, further comprising: an encoder configured to encode N data bit streams and generate N encoded data bit streams; and a bit mapper configured to map the N encoded data bit streams into the N data symbol streams.

In accordance with any embodiments of the present disclosure, the transmitter further comprising a Fast Fourier Transformation (FFT) converter configured to convert the N data symbol streams to frequency domain and generate N frequency domain data bearing sub-bands; the multiplexer further configured to multiplex the N frequency domain data bearing sub-bands and generate a multiplexed frequency domain data bearing signal; an inverse FFT (IFFT) converter configured to convert the multiplexed frequency domain data bearing signal into an In-phase time domain data bearing signal and a Quadrature time domain data bearing signal; and the DAC further configured to convert the In-phase time domain bearing signal and the Quadrature time domain data bearing signal into a second analog data bearing signal to be transmitted over the communication channel.

In accordance with any embodiments of the present disclosure, the zero-gap inserter is further configured to assign zero amplitude to at least a portion of the corresponding non-data symbols of at least two of the N data symbol streams; and frequency domain data bearing sub-bands associated with the at least two of the N data symbol streams are symmetrically distributed around a center frequency of a bandwidth of N frequency domain data bearing sub-bands associated with the N data symbol streams.

In accordance with any embodiments of the present disclosure, the transmitter framer is further configured to insert the non-data symbols at same time in the N data symbol streams.

In accordance with any embodiments of the present disclosure, the zero-gap inserter is further configured to assign zero amplitude to at least a portion of the corresponding non-data symbols of each of the N data symbol streams such that a timing of the portion of the corresponding non-data symbols of N/2 data symbol streams having zero amplitude partially overlaps with a timing of the portion of the corresponding non-data symbols of remaining N/2 data symbols.

In accordance with any embodiments of the present disclosure, the transmitter further comprising an electrical to optical converter configured to convert the analog data bearing signals to optical data bearing signals and transmit the optical data bearing signals on optical fibers.

In accordance with any embodiments of the present disclosure, the communication channel is an optical communication channel.

In accordance with any embodiments of the present disclosure, the communication channel is a wireless communication channel.

In accordance with any embodiments of the present disclosure, the non-data symbols are part of a non-data field inserted in each of the N data symbol streams.

In accordance with a second broad aspect of the present disclosure, there is provided receiver comprising: an analog-to-digital (ADC) converter configured to convert received analog data bearing signal to a digital data bearing signal; a processor configured to process the digital data bearing signal and generate associated N data symbol streams including corresponding non-data symbols, wherein at least a portion of the corresponding non-data symbols include almost zero amplitude symbols, wherein N is an integer value; a receiver framer configured to detect the corresponding non-data symbols in the N data symbol streams; and a mirror crosstalk detector configured to determine mirror crosstalk in at least one of the N data symbol streams by: detecting the portion of the corresponding non-data symbols of at least one of the N data symbol streams including the almost zero amplitude; computing a power of the portion of the corresponding non-data symbols including the almost zero amplitude; and evaluating the mirror crosstalk based on the computed power.

In accordance with any embodiments of the present disclosure, at least a portion of the corresponding non-data symbols of at least two of the N data symbol streams include almost zero amplitude symbols, such that: frequency domain data bearing sub-bands associated with the at least two of the N data symbol streams are located symmetrically distributed around a center frequency of a bandwidth of the N frequency domain data bearing sub-bands associated with the N data symbol streams, and a timing of the portion of the corresponding non-data symbols of a first data symbol stream of the N data symbol streams having almost zero amplitude partially overlaps with a timing of the portion of the corresponding non-data symbols of a second data symbol stream of the N data symbol streams having almost zero amplitude.

In accordance with any embodiments of the present disclosure, determining the mirror crosstalk further comprises: detecting the portion of the corresponding non-data symbols of the first data symbol stream having the almost zero amplitude; computing a first power of the portion of the corresponding non-data symbols of the first data symbol stream having the almost zero amplitude; detecting the portion of the corresponding non-data symbols of the first data symbol stream having the almost zero amplitude that overlaps with the portion of the corresponding non-data symbols of the second data symbol stream having the almost zero amplitude; computing a second power of the portion of the corresponding non-data symbols of the first data symbol stream having the almost zero amplitude that overlaps with the portion of the corresponding non-data symbols of the second data symbol stream having the almost zero amplitude; and computing a difference between the first power and the second power, the difference representing the mirror crosstalk.

In accordance with any embodiments of the present disclosure, the mirror crosstalk is the computed power.

In accordance with a third broad aspect of the present disclosure, there is provided method for transmission comprising: inserting, by a transmitter framer, corresponding non-data symbols to each of N data symbol streams, wherein N is an integer value; assigning, by a zero-gap inserter, zero amplitude to at least a portion of the corresponding non-data symbols of at least one of the N data symbol streams; multiplexing, by a multiplexer, the N data symbols to generate a multiplexed data bearing signal; and converting, by a digital-to-analog converter (DAC) the multiplexed data bearing signal into an analog data bearing signal to be transmitted over a communication channel.

In accordance with any embodiments of the present disclosure, the method further comprising encoding, by an encoder, N data bit streams to generate N encoded data bit streams; and mapping, by a bit mapper, the N encoded data bit streams into the N data symbol streams.

In accordance with any embodiments of the present disclosure, the method further comprising converting, by a Fast Fourier Transformation (FFT) converter, the N data symbol streams to frequency domain to generate N frequency domain data bearing sub-bands; multiplexing, by the multiplexer, the N frequency domain data bearing sub-bands to generate a multiplexed frequency domain data bearing signal; converting, by an inverse FFT (IFFT), the multiplexed frequency domain data bearing signal into an In-phase time domain bearing signal and a Quadrature time domain data bearing signal; and converting, by the DAC the In-phase time domain bearing signal and the Quadrature time domain data bearing signal into a second analog data bearing signal to be transmitted over the communication channel.

In accordance with any embodiments of the present disclosure, the method further comprising assigning, by the zero-gap inserter, zero amplitude to at least a portion of the corresponding non-data symbols of at least two of the N data symbol streams, wherein frequency domain data bearing sub-bands associated with the at least two of the N data symbol streams are symmetrically distributed around a center frequency of a bandwidth of N frequency domain data bearing sub-bands associated with the N data symbol streams.

In accordance with any embodiments of the present disclosure, the method further comprising assigning, by the zero-gap inserter, zero amplitude to at least a portion of the corresponding non-data symbols of each of the N data symbol streams such that a timing of the portion of the corresponding non-data symbols of N/2 data symbol streams having zero amplitude partially overlaps with a timing of the portion of the corresponding non-data symbols of remaining N/2 data symbols.

In accordance with any embodiments of the present disclosure, the method further comprising converting, by an electrical to optical converter, the analog data bearing signals to optical data bearing signals and transmitting the optical data bearing signals to optical fibers.

In accordance with a fourth broad aspect of the present disclosure, there is provided method for reception comprising: converting, by an analog-to-digital converter (ADC), a received analog data bearing signal to a digital data bearing signal; processing, by a processor, the digital data bearing signal to generate associated N data symbol streams including corresponding non-data symbols, wherein at least a portion of the corresponding non-data symbols include almost zero amplitude symbols, wherein N is an integer value; detecting, by a receiver framer, the corresponding non-data symbols in the N data symbol streams; and determining, by a mirror crosstalk detector, mirror crosstalk in at least one of the N data symbol streams by: detecting the portion of the corresponding non-data symbols of at least one of the N data symbol streams including the almost zero amplitude; computing a power of the portion of the corresponding non-data symbols including the almost zero amplitude; and evaluating the mirror crosstalk based on the computed power.

In accordance with any embodiments of the present disclosure, at least a portion of the corresponding non-data symbols of at least two of the N data symbol streams include almost zero amplitude symbols, such that: frequency domain data bearing sub-bands associated with the at least two of the N data symbol streams are located symmetrically distributed around a center frequency of a bandwidth of the N frequency domain data bearing sub-bands associated with the N data symbol streams, and a timing of the portion of the corresponding non-data symbols of a first data symbol stream of the N data symbol streams having almost zero amplitude partially overlaps with a timing of the portion of the corresponding non-data symbols of a second data symbol stream of the N data symbol streams having almost zero amplitude.

In accordance with any embodiments of the present disclosure, determining, by the mirror crosstalk detector, the mirror crosstalk further comprises: detecting the portion of the corresponding non-data symbols of the first data symbol stream having the almost zero amplitude; computing a first power of the portion of the corresponding non-data symbols of the first data symbol stream having the almost zero amplitude; detecting the portion of the corresponding non-data symbols of the first data symbol stream having the almost zero amplitude that overlaps with the portion of the corresponding non-data symbols of the second data symbol stream having the almost zero amplitude; computing a second power of the portion of the corresponding non-data symbols of the first data symbol stream having the almost zero amplitude that overlaps with the portion of the corresponding non-data symbols of the second data symbol stream having the almost zero amplitude; and computing a difference between the first power and the second power, the difference representing the mirror crosstalk.

In accordance with any embodiments of the present disclosure, the mirror crosstalk is the computed power.

BRIEF DESCRIPTION OF THE FIGURES

Further features and advantages of the present disclosure will become apparent from the following detailed description, taken in combination with the appended drawings, in which:

FIG. 16 depicts a flowchart of a process representing a method for transmission, in accordance with various non-limiting embodiments of the present disclosure; and FIG. 17 depicts a flowchart of a process representing a method for reception, in accordance with various non-limiting embodiments of the present disclosure.

Figure 1:
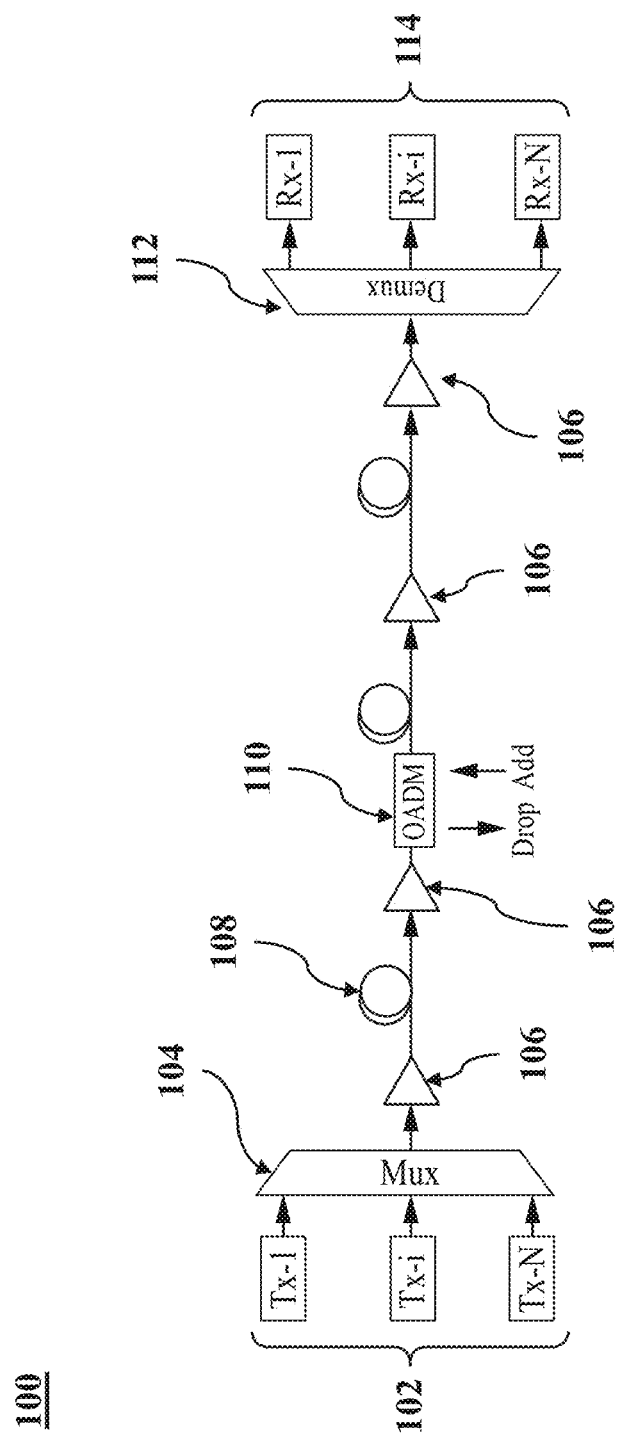
FIG. 1 (Prior Art) illustrates a conventional dense wavelength-division multiplexing (DWDM) optical network.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for transmission and reception.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for transmission and reception.

FIG. 1 (Prior Art) illustrates a conventional dense wavelength-division multiplexing (DWDM) optical network 100. As shown, the conventional DWDM optical network 100 includes transmitters 102, an optical multiplexer 104, multiple optical amplifiers 106, optical fibers 108, an optical add-drop multiplexer (OADM) 110 containing at least one wavelength selective switch (WSS), an optical demultiplexer 112 and receivers 114. The DWDM optical network 100 may include other components. However, such components have not been illustrated for the purpose of simplicity.

The transmitters 102 generate up to 100 optical signals (wavelengths). These optical signals are combined by the optical multiplexer 104. The combined optical signal is transmitted over the optical fibers 108. The optical amplifiers 106 are located along the optical fibers 108. The optical amplifiers 106 are used to compensate the loss from the optical fibers 108 and the associated components. The OADM 110 is used to drop and/or add channels. The channels are de-multiplexed at optical demultiplexer 112 before being received by the receivers 114.

Figure 2:
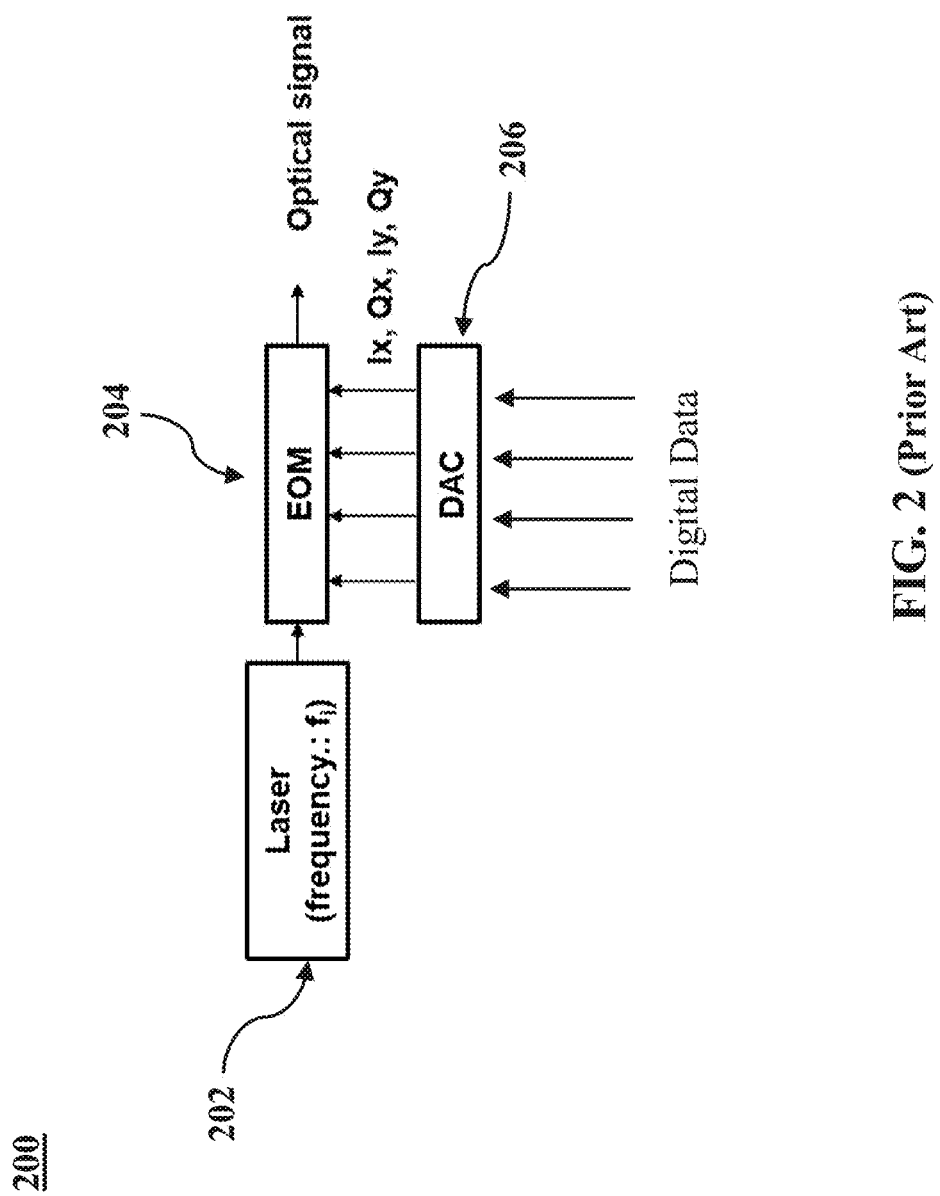
FIG. 2 (Prior Art) illustrates an optical modulator included in each of the transmitters.

Each DWDM channel carries a modulated optical signal to convey data from a transmitter side to the receiver side. FIG. 2 (Prior Art) illustrates an optical modulator 200 included in each of the transmitters 102. As shown, the optical modulator 200 includes a laser 202, an electro-optic modulator (EOM) 204, and a digital-to-analog converter (DAC) 206. The optical modulator 200 may include other components. However, such components have not been illustrated for the purpose of simplicity.

Typically, a coherent light from the laser operating at a center frequency of $f_i$ is modulated by the EOM 204 for the generation of the optical signal. For a polarization-division multiplexed (PDM) quadrature amplitude modulation (QAM) signal, the EOM 204 is driven by four electrical signals, each of which corresponds to either in-phase (I) or quadrature (Q) tributaries for both polarization, X and Y, respectively.

Figure 3A:
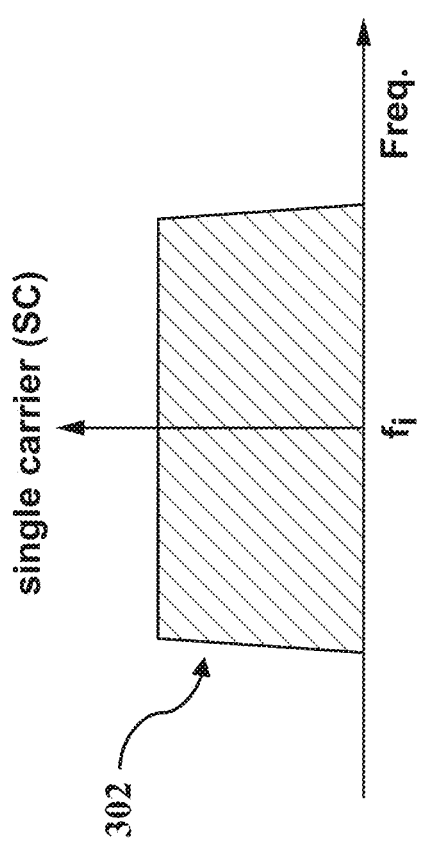
FIG. 3A (Prior Art) illustrates a spectrum of single carrier (SC) modulated optical signal.

The optical signal may be modulated using single carrier (SC). FIG. 3A (Prior Art) illustrates a spectrum of SC modulated optical signal 302. As shown, the spectrum shape of the SC modulated signal 302 is contiguous from the center frequency of the laser 204.

Figure 3B:
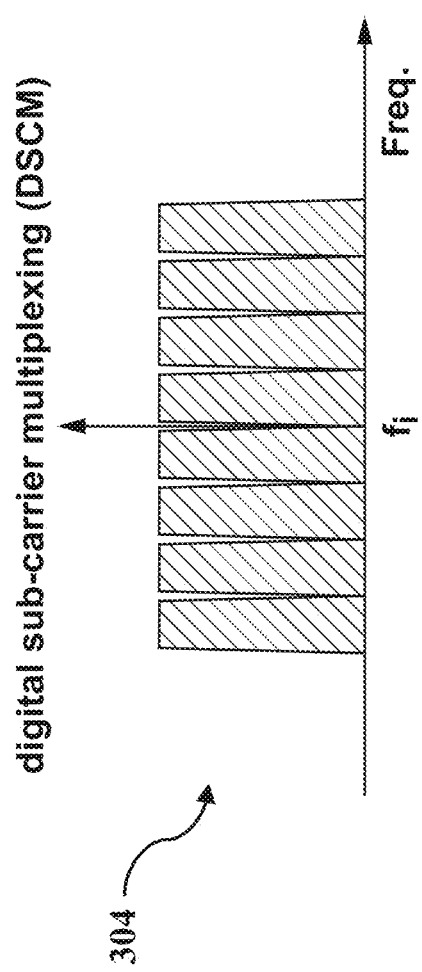
FIG. 3B (Prior Art) illustrates a spectrum of the Digital Sub-Carrier Multiplexing (DSCM) optical signal with 8 subcarriers.

The optical signal may also be modulated by multi-band or subcarrier scheme. In this case, the modulation data patterns are manipulated so as to create multiple spectrum bands with different frequency shifts from the center frequency of the laser 204. FIG. 3B (Prior Art) illustrates a spectrum of the Digital Sub-Carrier Multiplexing (DSCM) optical signal 304 with 8 subcarriers.

DSCM has been recognized as an effective solution for high spectral efficiency transmission beyond 800 Gb/s due to its reduced baud rate per band (i.e., subcarrier) and increased flexibility on network configuration such as a number of subcarriers, data rate, finer granularity, etc. Further, DSCM is a frequency division multiplexing (FDM) technique which makes use of multiple digitally created subcarriers on each wavelength. DSCM multiplexes multiple subcarriers at near Nyquist carrier spacing to provide a comparable spectral efficiency (SE) to SC modulation scheme. With modern transceivers, the generation of the subcarrier or multi-band can be performed digitally, e.g., using DAC.

The use of DSCM optical signals provides various advantages over SC signals such as 1) a low power solution for large dispersion compensation (e.g., ultra-long-haul) due to reduced complexity for per-subcarrier-basis dispersion compensation, 2) reduced fiber nonlinear penalty, 3) robustness to equalization enhanced phase noise caused by laser phase noise, especially for high-order modulation format, 4) mitigation of polarization dependent loss (PDL) penalty using soft decision forward error correction (FEC) gain sharing and sub-carrier state of polarization (SOP) pre-rotation, and 5) combining probabilistic constellation shaping (PCS) coding technique to enable flex baud rate and flex grid to well adopt to channel condition.

Compared to SC modulation scheme, the quality of a DSCM signal is much more sensitive to the hardware impairments. For example, when generating sub-carriers, each of which is equivalent to a single-side band (SSB) signal, any imbalance between I and Q can induce power leakage to the opposite frequency with respect to the laser's center frequency. This limited suppression ratio may cause the crosstalk to a sub-carrier at the opposite side of the spectrum and degrade the signal's quality. It is important to note that such IQ-imbalance impairments (including intensity/phase response imbalance, skew imbalance, and power imbalance) are generally more severe at higher frequency range, which might lead to strong dependency of signal quality on the spectral frequency.

Figure 4:
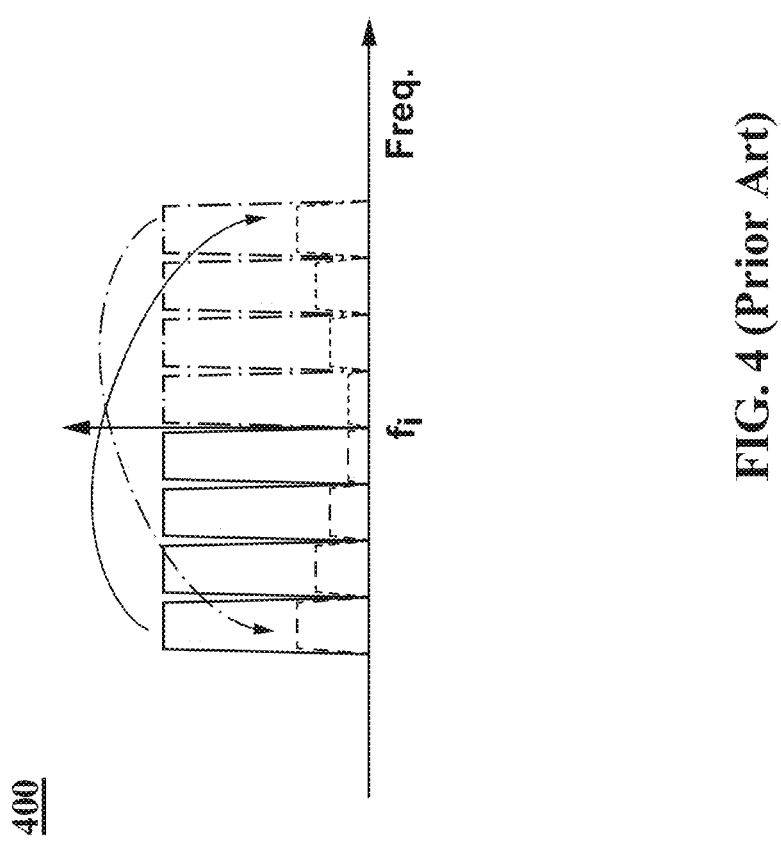
FIG. 4 (Prior Art) shows an illustration of the power leakage within an 8-subcarrier DSCM signal.

FIG. 4 (Prior Art) shows an illustration 400 of the power leakage within an 8-subcarrier DSCM signal. In each sub-band, the solid lines indicate the desired signals whereas the dashed lines show unwanted power leakages. This mirror image causes a mirror crosstalk between subcarrier pairs allocated symmetrically around the center frequency. The subcarrier pairs at the spectral edges is most likely to be degraded by mirror crosstalk. As previously discussed, many factors may contribute to mirror crosstalk, including IQ-imbalance, IQ-gain imbalance, IQ-differential phase, IQ-quadrature error, IQ-RF crosstalk.

Figure 5:
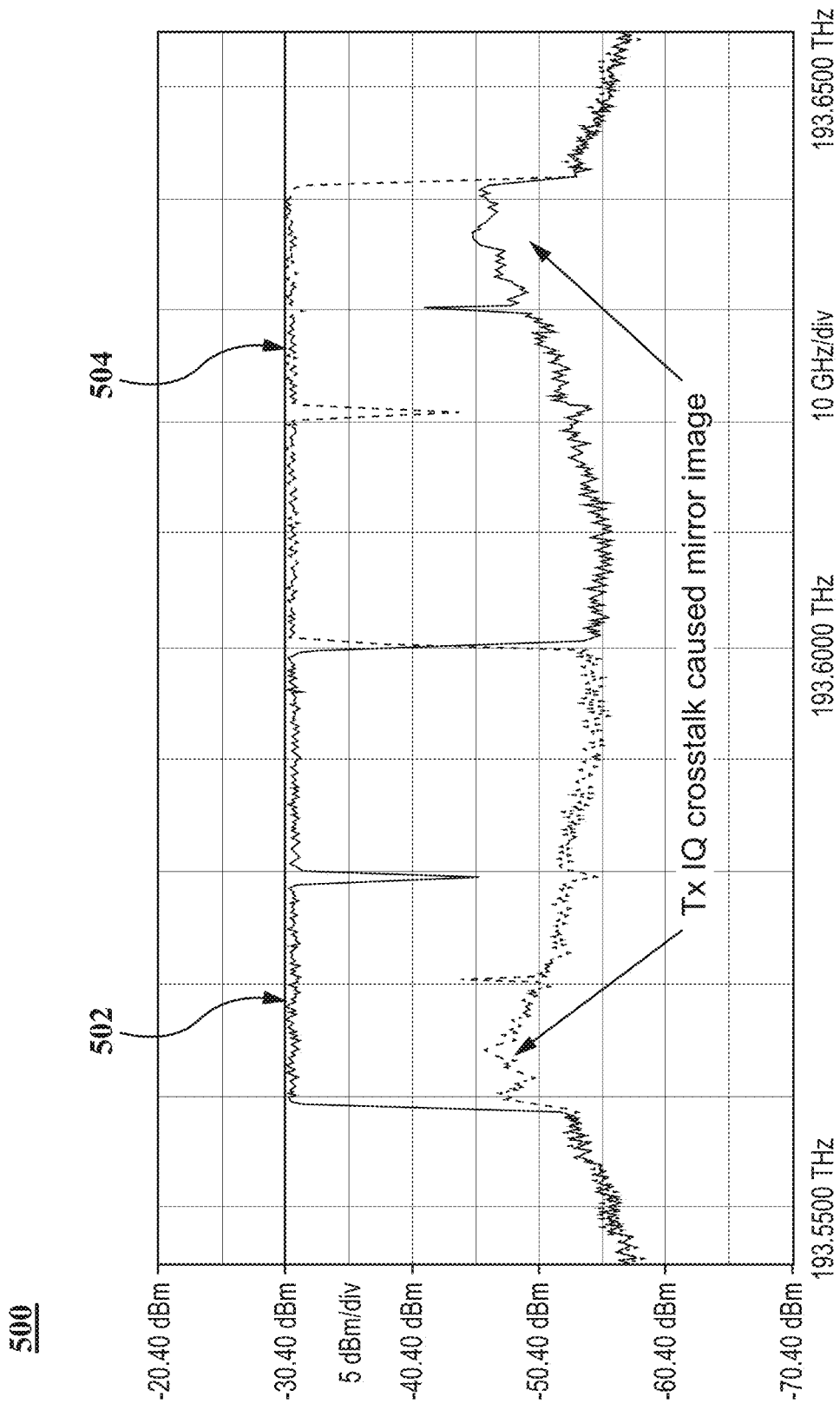
FIG. 5 (Prior Art) illustrates one measured mirror crosstalk example.

FIG. 5(Prior Art) illustrates one measured mirror crosstalk example 500. There are 4 subcarriers, the optical signal has a bandwidth of around 90 GHz, the spectrum is captured by an optical spectrum analyzer with high spectral resolution. Initially, the curve 502 having the two subcarriers with negative frequency (i.e., frequencies to the left of the center frequency of the overall bandwidth) are turned on, the curve 504 having the two subcarriers with positive frequency are turned off. If this is no mirror crosstalk, there should be no power in the positive frequency side of the carrier, their value in dBm should be negative infinity. However, a significant power is observed in the positive frequency side, which is the mirror image crosstalk from the subcarriers with negative frequency.

In a similar manner, for curve 504 having the two subcarriers with positive frequency (i.e., frequencies to the right of the center frequency of the overall bandwidth) are turned on and the curve 502 having the two subcarriers with negative frequency are turned off. A significant power is observed in the negative frequency side, which is the mirror image crosstalk from the subcarriers with positive frequency. The crosstalk in FIG. 5. is caused by the IQ imbalance of the EOM 204 (as shown in FIG. 2). This kind of mirror image can lead to significant performance impairment and must be monitored and mitigated.

Various conventional techniques to monitor crosstalk relies of crosstalk monitoring by an optical spectrum analyzer (OSA). The crosstalk monitoring is typically performed by turning off one of the pair of subcarriers for substantial amount of time and directly measuring the optical power leaked from the subcarrier at the opposite side with respect to the center frequency. The major drawback of such techniques is that these conventional techniques may not be used for online monitoring technique. Because the data needs to be blocked for a substantially long time in order to identify the power level using OSA, these techniques inherently interrupt the data transmission.

Instead of using optical spectrum in the frequency domain and turning off subcarriers for significant amount of time resulting in a block of real-time data traffic, various embodiments of the present disclosure exploit pre-defined zero-power gaps (or symbols) in the time domain for the monitoring of mirror crosstalk. As opposed to the prior art, techniques of the present disclosure may monitor the mirror crosstalk without blocking the real-time data traffic.

Figure 6:
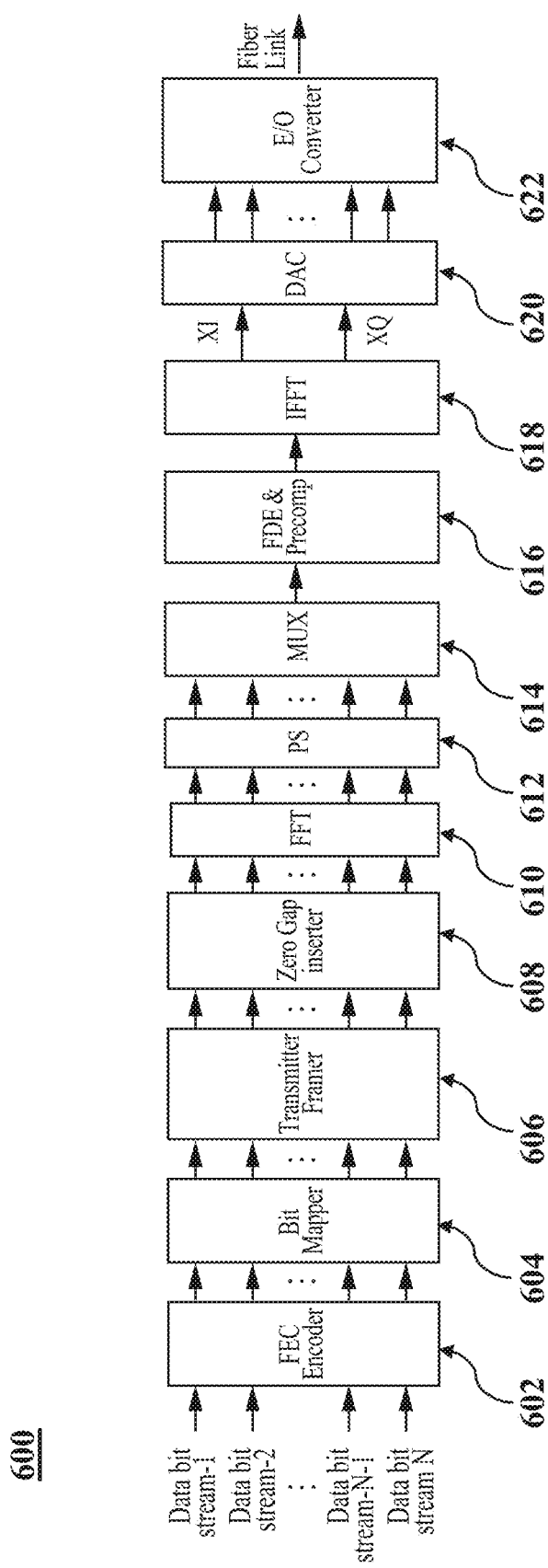
FIG. 6 illustrates a high-level functional block diagram of a transmitter configured to generate optical signals using DSCM, in accordance with various non-limiting embodiments of the present disclosure.

With this said, FIG. 6 illustrates a high-level functional block diagram of a transmitter 600 configured to generate optical signals using DSCM, in accordance with various non-limiting embodiments of the present disclosure. As shown, the transmitter 600 may include a forward error correction (FEC) encoder 602, a bit mapper 604, a transmitter framer 606, a zero-gap inserter 608, a Fast Fourier Transform (FFT) converter 610, a pulse shaper (PS) 612, a multiplexer (MUX) 614, frequency domain equalization (FDE) and pre-compensator 616, an inverse FFT converter 618, and a DAC 620. The transmitter 100 may include other components, however, such components have been omitted from FIG. 6 for the purpose of simplicity.

It is to be noted that one or more components of the transmitter 600 may be software components implemented on one or more processors, while other components may be hardware components. How the components have been implemented should not limit the scope of present disclosure.

The FEC encoder 602 may receive N data bit streams. The FEC encoder 602 may encode N data bit streams and generate N encoded data bit streams. The encoding techniques used by the FEC encoder 602 should not limit the scope of present disclosure. The bit mapper 604 may map the N encoded data bit streams into N data symbol streams. The transmitter framer 606 may insert corresponding non-data symbols to each of the N data symbol streams. In certain non-limiting embodiments, the transmitter framer 606 may align a timing of the non-data symbols in each of the N data symbol streams. In other words, the transmitter framer 606 may insert the non-data symbols at same time in the N data symbol streams. The non-data symbols may for example and without limitation be a part of header symbols inserted in each of the N data symbol stream.

The zero-gap inserter 608 may assign zero amplitude to at least a portion of the corresponding non-data symbols (few consecutive symbols e.g., around 10 symbols) of at least one the N data symbol streams. In certain non-limiting embodiments, some of the redundant bits in the non-data symbols may be assigned with zero amplitude so that significant information may not be lost.

After zero-power gap insertion, the FFT converter 610 may convert the N data symbol streams (including the corresponding non-data symbols (including the zero amplitude symbols)) to the frequency domain and generate N frequency domain data bearing sub-bands.

In certain non-limiting embodiments, the PS 612 may perform pulse shaping of the N frequency domain data bearing sub-bands. The Multiplexer 614 may multiplex the N frequency domain data bearing sub-bands and generate a multiplexed frequency domain data bearing signal.

The FDE & pre-compensator 616 may perform frequency domain equalization and pre-compensation to minimize hardware-induced impairments. The IFFT convertor 618 may convert the multiplexed, frequency domain data bearing signal into an In-phase time domain and a Quadrature time domain signal.

The digital-to-analog converter (DAC) 620 may convert the In-phase and Quadrature time domain signals to analog data bearing signals to be transmitted over a communication channel. It is to be noted that FIG. 6 illustrates signals in one polarization (e.g., X-polarization), however, the same structure may be used other polarization (Y-polarization).

It is to be noted that in certain non-limiting embodiments, after zero-power gap insertion, the multiplexer 614 may multiplex the N data symbol streams (including the corresponding non-data symbols (including the zero amplitude symbols)) to a multiplexed data bearing signal. In certain non-limiting embodiments, the DAC 620 may convert the multiplexed data bearing signals to the analog data bearing signals to be transmitted over the communication channel.

In certain non-limiting embodiments, the communication channel may be any suitable communication channel including an optical channel and/or a wireless channel without limiting the scope of present disclosure. With this said, in some non-limiting embodiments, the transmitter 610 may include an electrical-to-optical (E/O) converter 622. The E/O converter 622 may convert the analog data bearing signals to optical data bearing signals and transmit the optical data bearing signals on optical communication channels. In other non-limiting, the transmitter 600 may include RF transmission part (not illustrated) having an antenna structure and RF amplifier structure. The antenna structure may transmit the analog data bearing signals to wireless communication channels.

Unlike various conventional techniques that rely on the optical spectrum in the frequency domain to monitor mirror crosstalk, various non-limiting embodiments of the present disclosure rely on exploiting pre-defined zero-power gaps (or symbols) in time domain for the monitoring of mirror crosstalk. Further, as opposed to the conventional techniques, techniques disclosed in the present disclosure may require neither signal blocking (i.e., loss of information) nor additional hardware for measurement.

Figure 7:
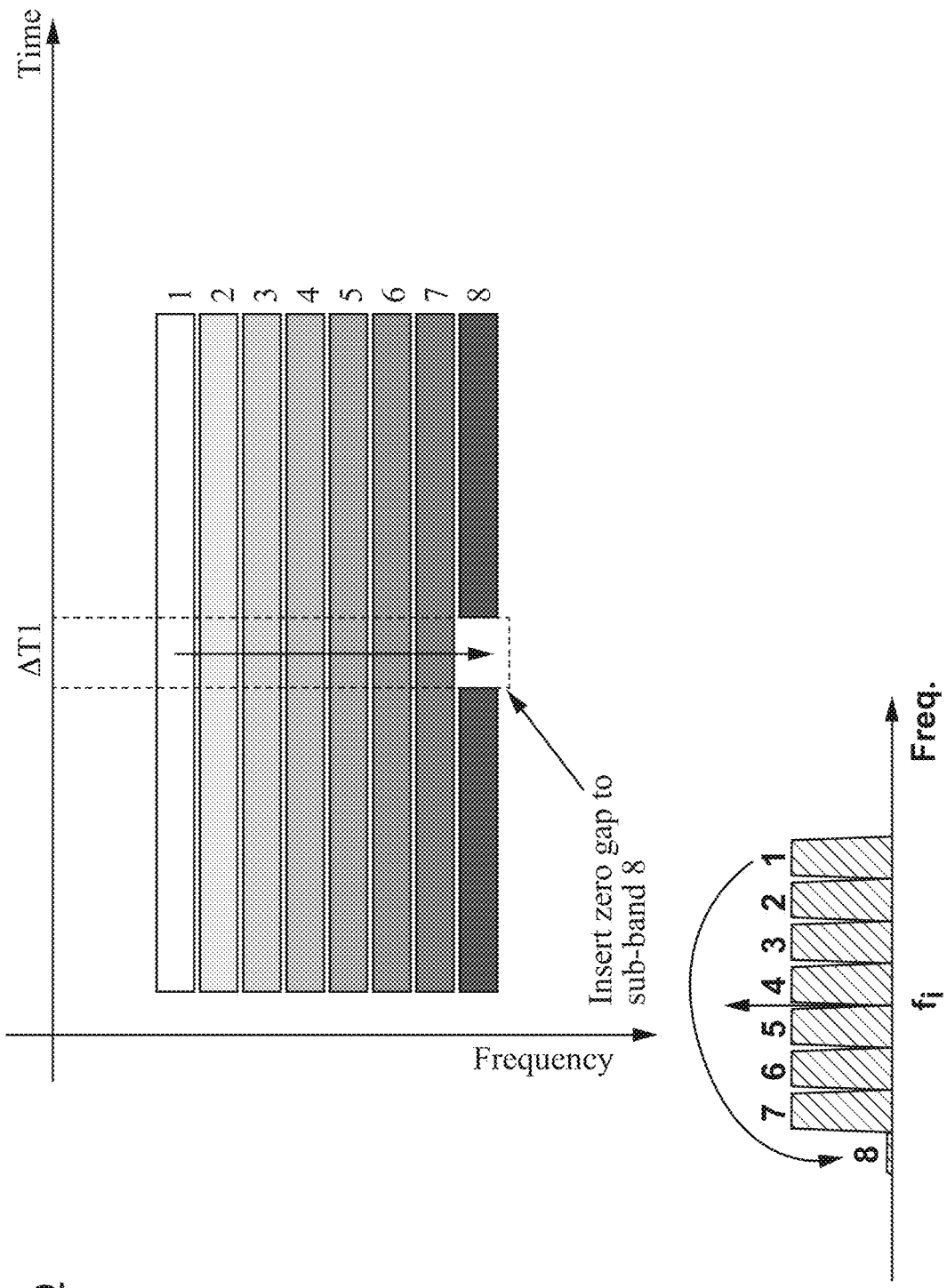
FIG. 7 illustrates an example directed towards a zero-power gap insertion technique, in accordance with various non-limiting embodiments of the present disclosure.

FIG. 7 illustrates an example 700 directed towards zero-power gap insertion technique, in accordance with various non-limiting embodiments of the present disclosure. The example 700 illustrates a DSCM signal composed of 8 subcarriers. The vertical axis indicates spectral frequency of each subcarriers, while the horizontal axis indicates the symbols (including non-data symbols and data symbols) in the time domain. In one embodiment, the non-data symbol of the eighth subcarrier may include zero-power symbols during a time period $\Delta T1$. It is to be noted that ideally a power in the eighth subcarrier during the time period $\Delta T1$ may be equal to zero. However, in practical scenarios, the eighth subcarrier may have some power during the time period $\Delta T1$ due to mirror crosstalk from the first subcarrier on the opposite side with respect to the center frequency. In addition to the mirror crosstalk, during the time period $\Delta T1$, the eighth subcarrier may include additive noises such as amplified spontaneous emission (ASE) from the optical amplifiers 106 in the DWDM optical network 100 (as shown in FIG. 1), implementation noise, nonlinearity noise or the like.

In order to discriminate the mirror crosstalk from other noise factors, in certain non-limiting embodiments, the zero-gap inserter 608 (as shown in FIG. 6) may be further configured to assign zero amplitude to at least a portion of the corresponding non-data symbols of at least two of the N data symbol streams. The frequency domain data bearing sub-bands associated with the at least two of the N data symbol streams may be symmetrically distributed around the center frequency $f_i$.

Figure 8:
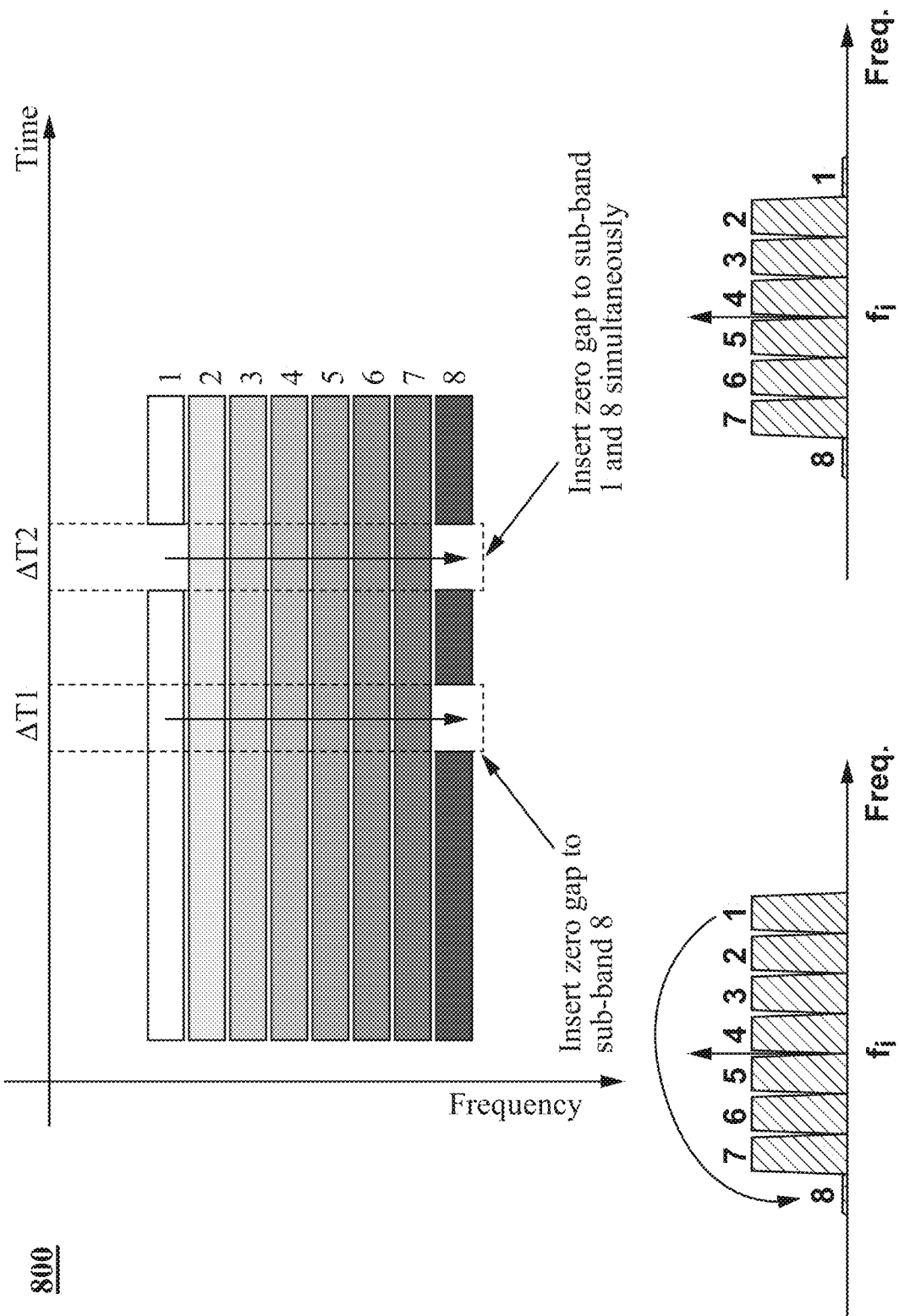
FIG. 8 illustrates another example directed towards the zero-power gap insertion technique, in accordance with various non-limiting embodiments of the present disclosure.

FIG. 8 illustrates another example 800 directed towards zero-power gap insertion technique, in accordance with various non-limiting embodiments of the present disclosure. As shown, the zero-gap inserter 608 may assign zero amplitude to at least a portion of the corresponding non-data symbols of first subcarrier and eighth subcarrier simultaneously during the time period ΔT2. In this case, there may not be any mirror crosstalk between the first subcarrier and the eighth subcarrier as both subcarriers may not carry any data during the time period ΔT2. Rather, there may be attribution of other noises during the time period ΔT2 including ASE, implementation noise, and nonlinear noise. Therefore, at a receiver side (which will be discussed later in the disclosure) by measuring the powers P(ΔT1), P(ΔT2) of eighth subcarrier during the time periods ΔT1 and ΔT2 respectively, the mirror crosstalk power may be selectively estimated as P×t=P(ΔT1)−P(ΔT2).

It is to be noted that the above illustrated examples 700 and 800 are non-limiting and that the monitoring of mirror crosstalk of any arbitrary subcarrier may be possible with identical configuration. The power in the gaps (e.g., during the time periods ΔT1 and ΔT2) may be calculated from detected signal waveforms in the time domain at the receiver side. A simple crosstalk detection block may be used after conventional coherent receiver DSP. Unlike the conventional techniques, a few symbols with zero-power may be sufficient to measure the power due to time-domain per-symbol operation.

In certain non-limiting embodiments, the zero-gap inserter 608 (as shown in FIG. 6) may be further configured to assign zero amplitude to at least a portion of the corresponding non-data symbols of each of the N data symbol streams such that a timing of the portion of the corresponding non-data symbols of N/2 data symbol streams having zero amplitude partially overlaps with the timing of the portion of the corresponding non-data symbols of remaining N/2 data symbols.

Figure 9:
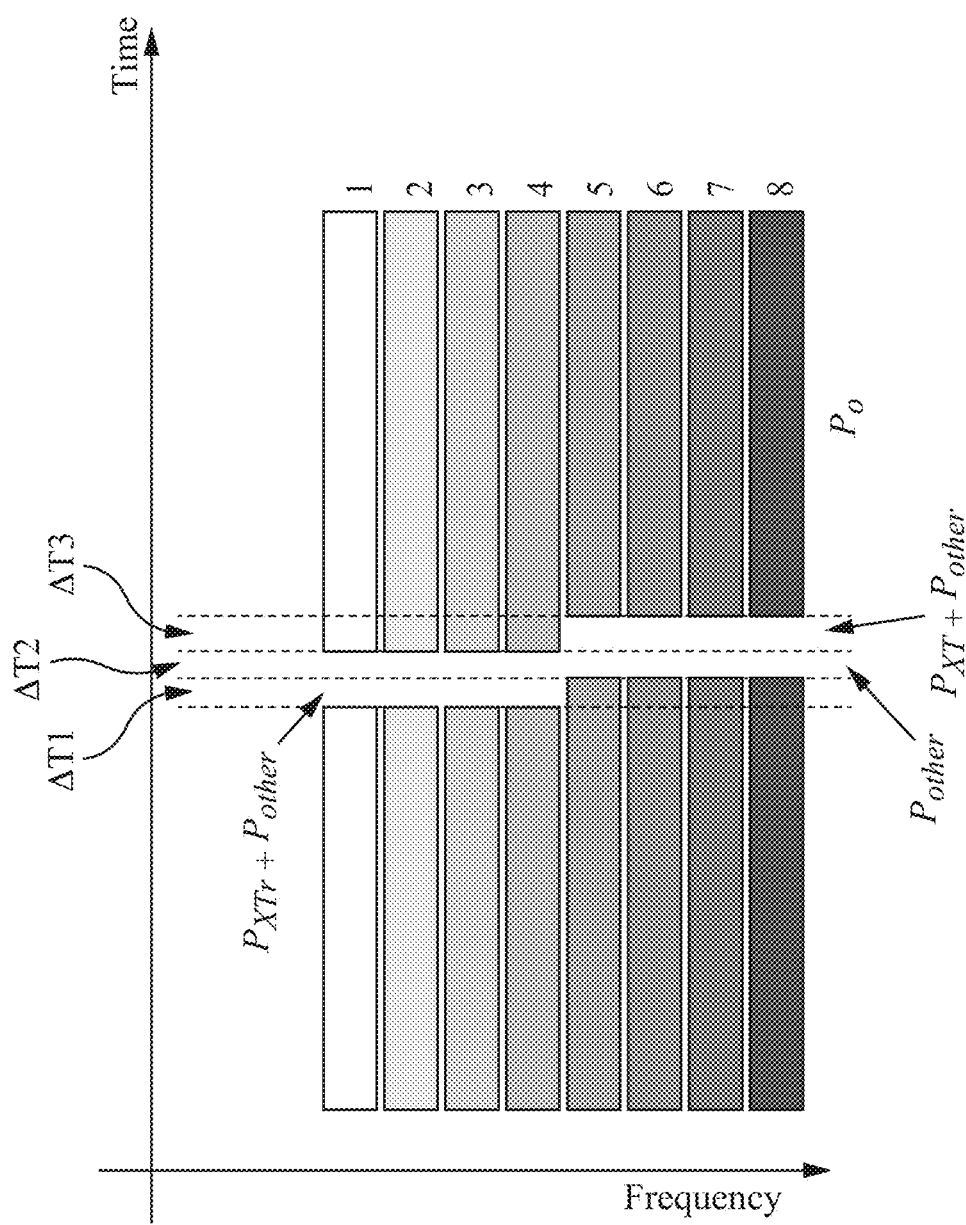
FIG. 9 illustrates another example directed towards the zero-power gap insertion technique, in accordance with various non-limiting embodiments of the present disclosure.

FIG. 9 illustrates another example 900 directed towards zero-power gap insertion technique, in accordance with various non-limiting embodiments of the present disclosure. As shown, the zero-gap inserter 608 may assign zero amplitude to at least a portion of the corresponding non-data symbols of subcarriers 1 to 4 during a time period of ΔT1+ΔT2. Also, the zero-gap inserter 608 may assign zero amplitude to at least a portion of the corresponding non-data symbols of subcarriers 5 to 8 during a time period of ΔT2+ΔT3. In this case, the time period ΔT2 may represent a partial overlapping of zero amplitude symbols in all of the subcarriers 1 to 8.

In the overlapped time period ΔT2, there may not be any mirror crosstalk as none of the subcarriers 1 to 8 is carrying any data. Any detectable power in each of the subcarriers 1 to 8 in this time period ΔT2 may be from other noise factors. In the non-overlapped time period ΔT1, there may be mirror crosstalk in each of the subcarriers 1, 2, 3 and 4 due to subcarriers 8, 7, 6 and 5, respectively, along with the other noises. Similarly, in the non-overlapped time period ΔT3, there may be mirror crosstalk in the subcarriers 5, 6, 7 and 8 due to subcarriers 4, 3, 2 and 1, respectively, along with the other noises. Therefore, a mirror crosstalk in any one of the subcarriers 1 to 4 due to subcarriers 8 to 5 may be obtained by subtracting the power of each of the subcarriers 1 to 4 during the time period ΔT2 from the power of each of the subcarriers 1 to 4 during the time period ΔT1. Similarly, a mirror crosstalk in any one of the subcarriers 5 to 8 due to subcarriers 4 to 1 may be obtained by subtracting the power of each of the subcarriers 5 to 8 during the time period ΔT2 from the power of each of the subcarriers 5 to 8 during the time period ΔT3.

Figure 10:
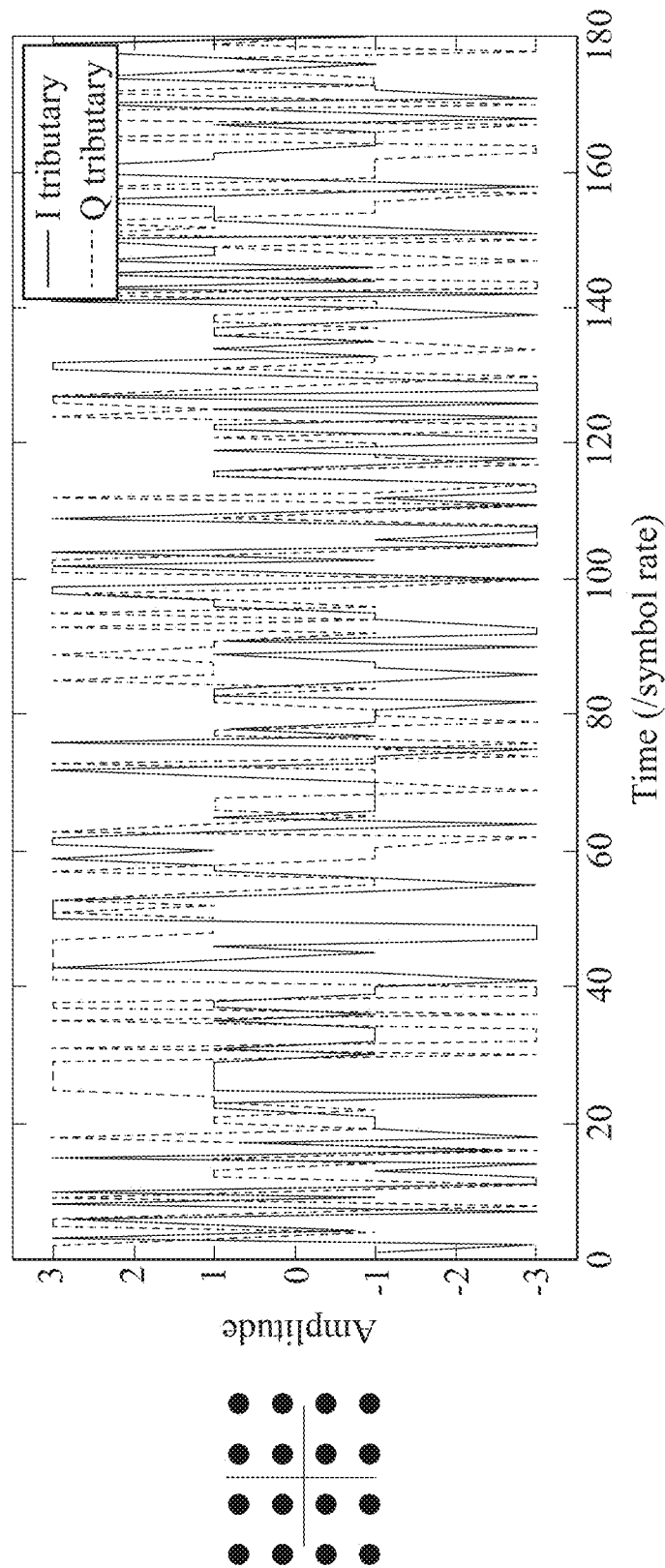
FIG. 10 illustrates an outcome, in accordance with various non-limiting embodiments of the present disclosure.
Figure 11A:
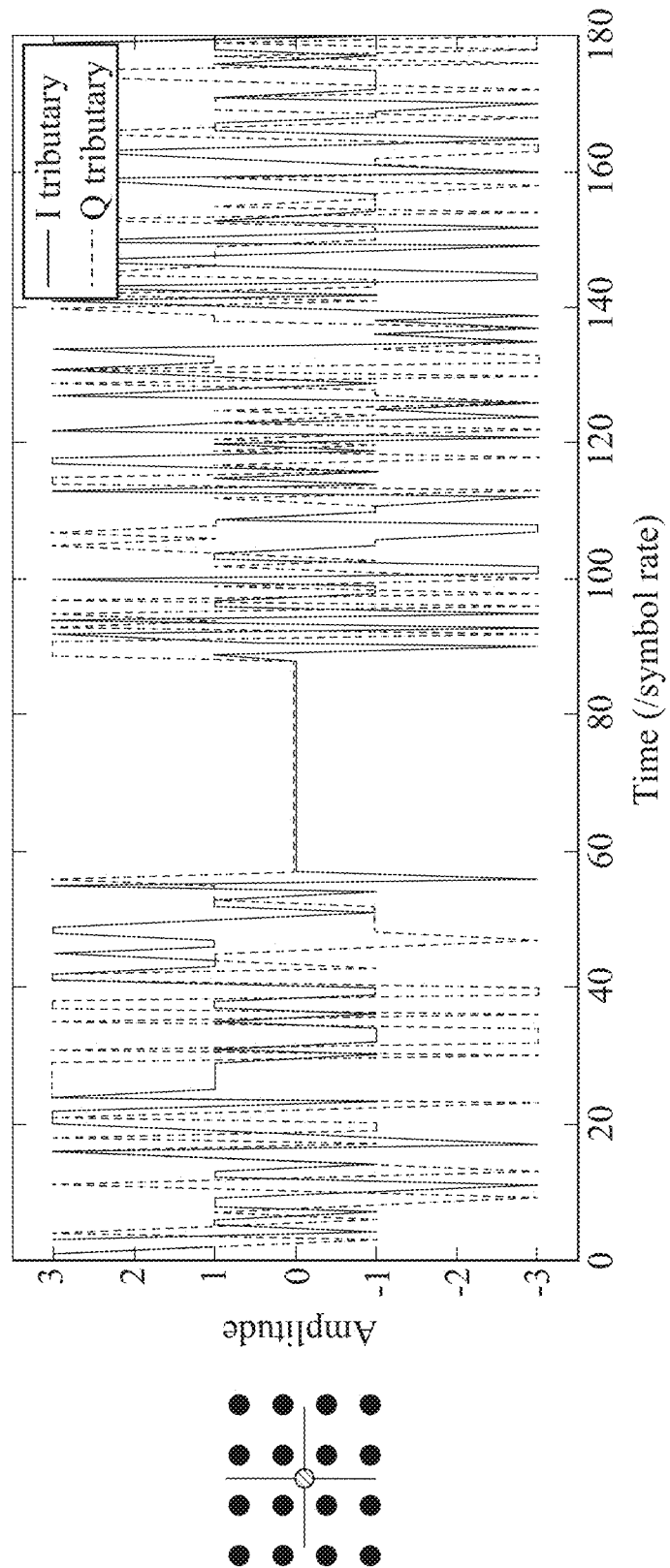
FIG. 11A illustrates another outcome, in accordance with various non-limiting embodiments of the present disclosure.
Figure 11B:
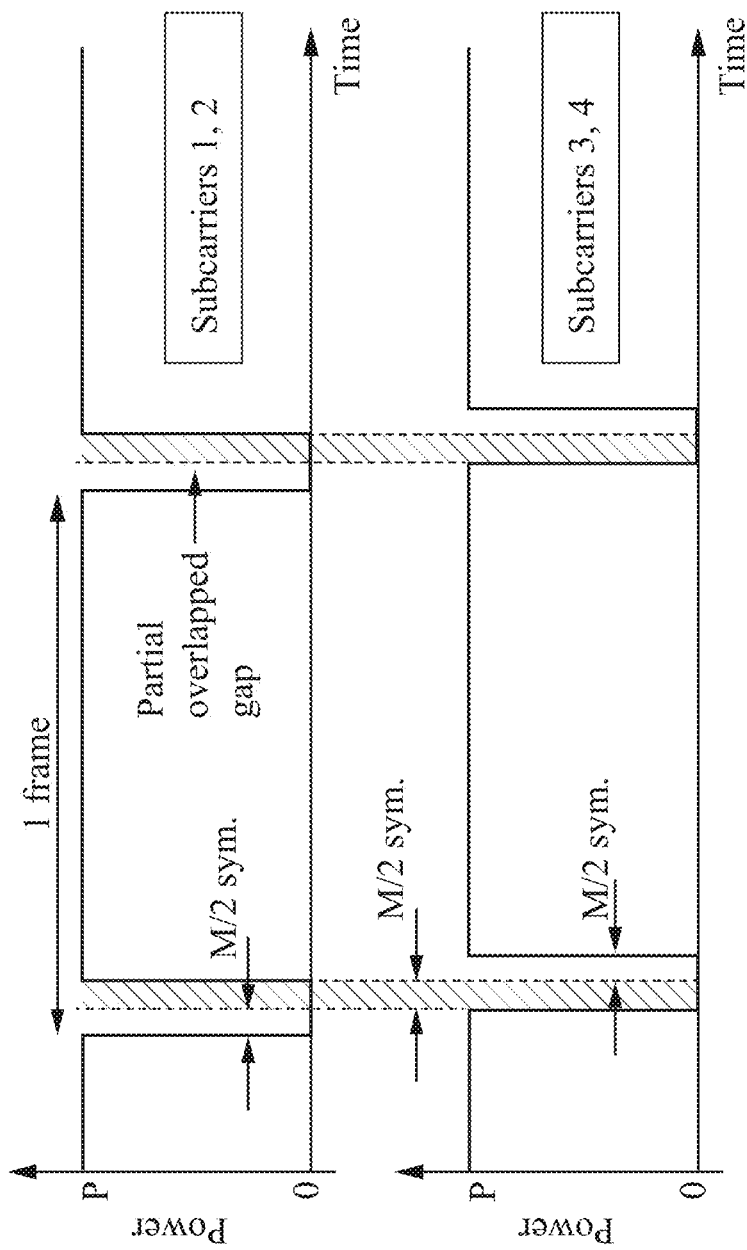
FIG. 11B illustrates an example of power waveform of four subcarriers with 16 QAM, in accordance with various non-limiting embodiments of the present disclosure.

FIG. 10 illustrates an outcome 1000, in accordance with various non-limiting embodiments of the present disclosure. The outcome 1000 illustrates 16 QAM symbols to be mapped over one of 4 subcarriers. FIG. 11A illustrates another outcome 1100, in accordance with various non-limiting embodiments of the present disclosure. The outcome 1100 illustrates the 16 QAM symbols including zero amplitude symbols to be mapped over one of 4 subcarriers. FIG. 11B illustrates an example 1150 of power waveform of four subcarriers with 16 QAM, in accordance with various non-limiting embodiments of the present disclosure. As shown, M symbols of zero power may be inserted to each subcarrier including partial overlapped gap of M/2 symbols in every frame.

Figure 12:
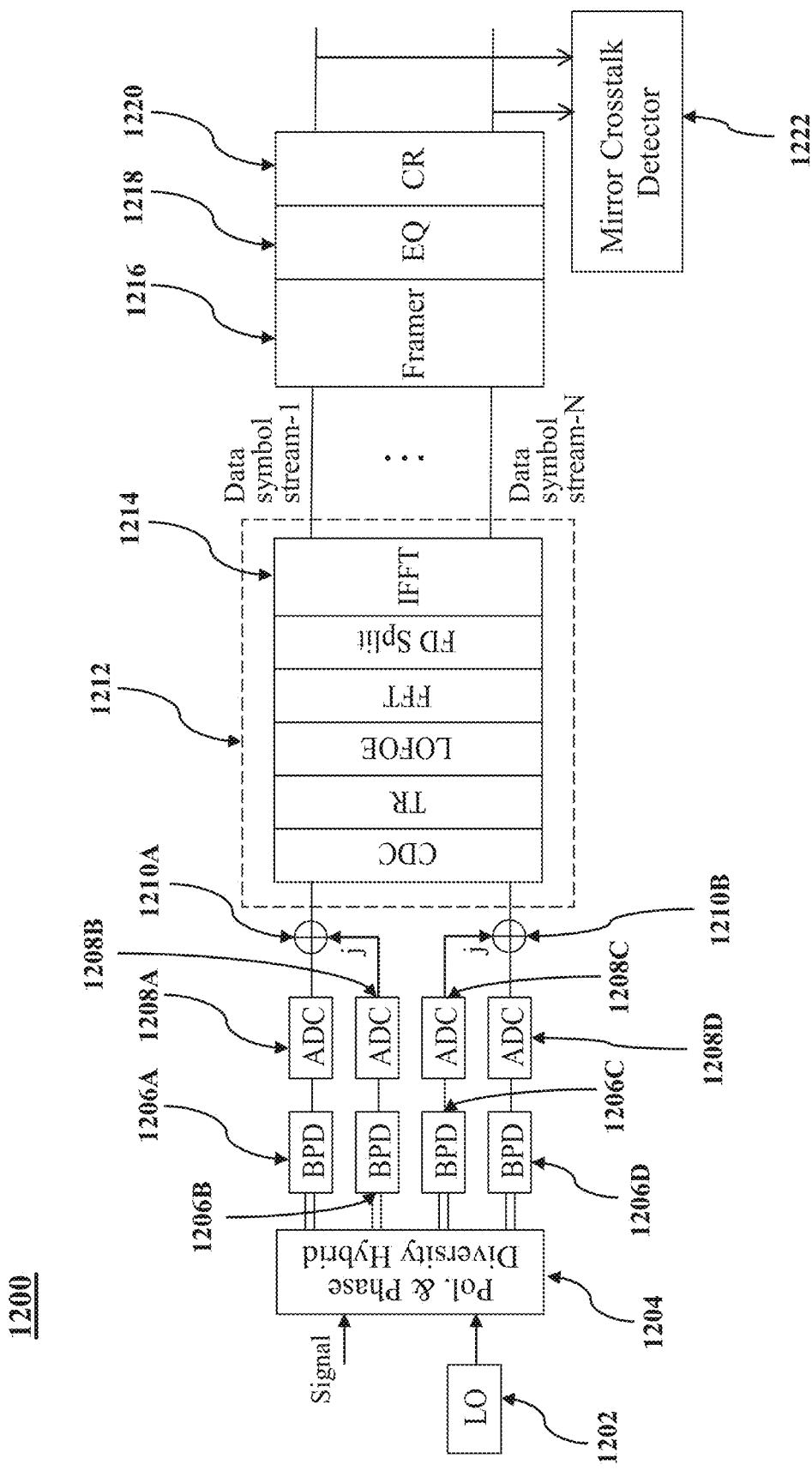
FIG. 12 illustrates a high-level functional block diagram of a receiver configured to receive signals transmitted from the transmitter, in accordance with various non-limiting embodiments of the present disclosure.

FIG. 12 illustrates a high-level functional block diagram of a receiver 1200 configured to receive signals transmitted from the transmitter 600, in accordance with various non-limiting embodiments of the present disclosure. As shown, the receiver 1200 may include a local oscillator (LO) 1202, a polarization and phase diversity hybrid device 1204, a plurality of balanced photodetectors (BPD) 1206A, 1206B, 1206C, and 1206D, a plurality of analog-to-digital converters (ADCs) 1208A, 1208B, 1208C, and 1208D, a plurality of combiners 1210A, and 1210B, a processor 1212 including an IFFT converter 1214, a receiver framer 1216, an equalizer (EQ) 1218, a carrier recovery module 1220 and a mirror crosstalk detector 1222. It is to be noted that the receiver 1200 may include other components, however, such components have been omitted from FIG. 12 for the purpose of simplicity.

It is to be noted that one or more components of the receiver 1200 may be software components implemented on one or more processors, while other components may be hardware components. How the components have been implemented should not limit the scope of present disclosure.

The LO 1202 may generate a continuous-wave signal based on a tuning frequency and may provide the local signal to the polarization and phase diversity hybrid device 1204. The polarization and phase diversity hybrid device 1204 may also receive optical data bearing signals transmitted by the transmitter 600. The polarization and phase diversity hybrid device 1204 may mix the optical data bearing signals with different polarization and quadrature states associated with the local signal in the complex-field space and then deliver the optical data bearing signals to the plurality of BPDs 1206A, 1206B, 1206C, and 1206D.

The plurality of BPDs 1206A, 1206B, 1206C, and 1206D may convert the optical data bearing signals to analog data bearing signals. It is to be noted that the LO 1202, the polarization and phase diversity hybrid device 1204, the plurality of BPD 1206A, 1206B, 1206C, and 1206D may be optional components, being present in case the transmitted signal is optical in nature. On the other hand, if the transmitted signal is radio frequency signal, accordingly, the receiver 1200 may have some state-of-the-art additional components to receive and process the radio frequency signals to extract analog data bearing signals.

The plurality of ADCs 1208A, 1208B, 1208C, and 1208D may convert the analog data bearing signals to digital data bearing signals (for e.g., In-phase time domain data bearing signals and Quadrature time domain data bearing signals). The plurality of combiners 1210A, and 1210B may combine the In-phase time domain data bearing signals and the quadrature time domain data bearing signals and generate combined time domain data bearing signals.

The processor 1212 may process the digital data bearing signals (e.g., combined time domain data bearing signals) to generate associated N frequency domain data bearing sub-bands, where N is an integer value. In certain non-limiting embodiments, to process the combined time domain data bearing signals, the processor 1212 may perform chromatic dispersion compensation (CDC) by using linear digital filters, perform timing recovery (TR) by detecting and recovering any timing discrepancy between the transmitter 600 and the receiver 1200, perform LO frequency offset estimation (LOFOE), perform FFT to convert the combined time domain data bearing signals to combined frequency domain data bearing signals and perform frequency domain splitting of the combined frequency domain data bearing signals into N frequency domain data bearing sub-bands.

The IFFT converter 1214 may convert the N frequency domain data bearing sub-bands to N data symbol streams including corresponding non-data symbols, wherein at least a portion of the corresponding non-data symbols include almost zero amplitude symbols. The receiver framer 1216 may detect the corresponding non-data symbols in the N data symbol streams. The information in the detected non-data symbols may be used for further processing (e.g., equalization, carrier recovery or the like) of the N data symbol streams.

In certain non-limiting embodiments, the EQ 1218 may be a 2×2 MIMO. The N data symbol streams may be a mixture of both X- and Y-polarization components. To this end, the EQ 1218 may perform demultiplexing. The carrier recovery module 1220 may estimate and compensate carrier phase error.

The mirror crosstalk detector 1222 may detect crosstalk in the N data symbol streams by analyzing the corresponding non-data symbols. As previously discussed, the zero-gap inserter 608 of the transmitter 600 (as shown in FIG. 6) may assign zero amplitude to at least a portion of the corresponding non-data symbols of at least one of the N data symbol streams. To this end, the mirror crosstalk detector 1222 may detect the portion of the corresponding non-data symbols of at least one of the N data symbol streams which was initially assigned zero amplitude by the transmitter 600.

In certain non-limiting embodiments, the transmitter 600 may also transmit a timing information of the non-data symbols where the zero amplitudes were inserted. The mirror crosstalk detector 1222 may compute a power of the detected portion of the corresponding non-data symbols of at least one of the N data symbol streams. The mirror crosstalk detector 1222 may evaluate the mirror crosstalk based on the computed power. The computed power may correspond to mirror crosstalk. It is to be noted that the computed power may also include the effect of channel noise such as ASE, implementation noise, and nonlinear noise.

To further improve the accuracy of the detected mirror crosstalk, in certain non-limiting embodiments, the mirror crosstalk detector 1222 may detect the portion of the corresponding non-data symbols of at least two N data symbol streams which were initially assigned zero amplitude by the transmitter 600.

As previously discussed in an example (as shown in FIG. 8), the zero-gap inserter 608 of the transmitter 600 may assign zero amplitude to at least a portion of the corresponding non-data symbols of first subcarrier during the time period $\Delta T1$ and may assign zero amplitude to at least a portion of the corresponding non-data symbols of first subcarrier and eighth subcarrier simultaneously during the time period $\Delta T2$. In this case, there may not be any mirror crosstalk between the first subcarrier and the eighth subcarrier as both subcarriers may not carry any data during the time period $\Delta T2$. Rather, there may be attribution of other noises during the time period $\Delta T2$ including ASE, implementation noise, and nonlinear noise. To this end, the mirror crosstalk detector 1222 may compute power in the detected portion of the corresponding non-data symbols of at eighth data symbol stream in the time periods $\Delta T1$ and $\Delta T2$, the powers may be defined as $P(\Delta T1)$, $P(\Delta T2)$ respectively.

In this case, the power $P(\Delta T1)$ may include the effect of mirror crosstalk due to first data stream on the eighth data stream as well as the channel noise. Also, the power $P(\Delta T2)$ may include channel noise in the eighth data stream. The mirror crosstalk detector 1222 may compute mirror crosstalk in the eighth data stream due to first data stream by computing a difference between the two powers $P(\Delta T1)$, $P(\Delta T2)$. Hence the mirror crosstalk in the eighth data stream in this case may be defined as $P\times t = P(\Delta T1) - P(\Delta T2)$. In a similar manner, the mirror crosstalk monitor 1222 may determine the mirror crosstalk in any of the N data symbol streams.

To determine mirror crosstalk in N data symbol streams, in certain non-limiting embodiments, the transmitter 600 and in particular the zero-gap inserter 608 may assign zero amplitude to at least a portion of the corresponding non-data symbols of each of the N data symbol streams such that a timing of the portion of the corresponding non-data symbols of N/2 data symbol streams having zero amplitude partially overlaps with a timing of the portion of the corresponding non-data symbols of remaining N/2 data symbols.

By way of example, (as previously discussed in FIG. 9) the zero-gap inserter 608 may assign zero amplitude to at least a portion of the corresponding non-data symbols of subcarriers 1 to 4 during the time period of $\Delta T1 + \Delta T2$. Also, the zero-gap inserter 608 may assign zero amplitude to at least a portion of the corresponding non-data symbols of subcarriers 5 to 8 during the time period of $\Delta T2 + \Delta T3$. In this case, the time period $\Delta T2$ may represent a partial overlapping of zero amplitude symbols in all of the subcarriers 1 to 8.

In the overlapped time period $\Delta T2$, there may not be any mirror crosstalk as none of the subcarriers 1 to 8 is carrying any data. Any detectable power in this time period $\Delta T2$ may be from other noise factors. In the non-overlapped time period $\Delta T1$, there may be mirror crosstalk in the subcarriers 1 to 4 due to subcarriers 8 to 5 respectively along with the other noises. Similarly, in the non-overlapped time period $\Delta T3$, there may be mirror crosstalk in the subcarriers 5 to 8 due to subcarriers 4 to 1 respectively along with the other noises.

To this end, to determine a mirror crosstalk in the subcarriers 1 to 4 due to subcarriers 8 to 5, the mirror crosstalk detector 1222 may compute the power of each of the subcarriers 1 to 4 during the time period $\Delta T2$ and each of the power of subcarriers 1 to 4 during the time period $\Delta T1$. The mirror crosstalk detector 1222 may determine the mirror crosstalk in each of the subcarriers 1 to 4 by subtracting the power of each of the subcarriers 1 to 4 during the time period $\Delta T2$ from the power of the same subcarriers 1 to 4 during the time period $\Delta T1$.

Similarly, to determine a mirror crosstalk in the subcarriers 5 to 8 due to subcarriers 4 to 1, the mirror crosstalk detector 1222 may compute the power of each of the subcarriers 5 to 8 during the time period $\Delta T2$ and the power of each of subcarriers 5 to 8 during the time period $\Delta T3$. The mirror crosstalk detector 1222 may determine the mirror crosstalk in each of the subcarriers 5 to 8 by subtracting the power of each of the subcarriers 5 to 8 during the time period $\Delta T2$ from the power of the same subcarriers 5 to 8 during the time period $\Delta T3$.

Figure 13:
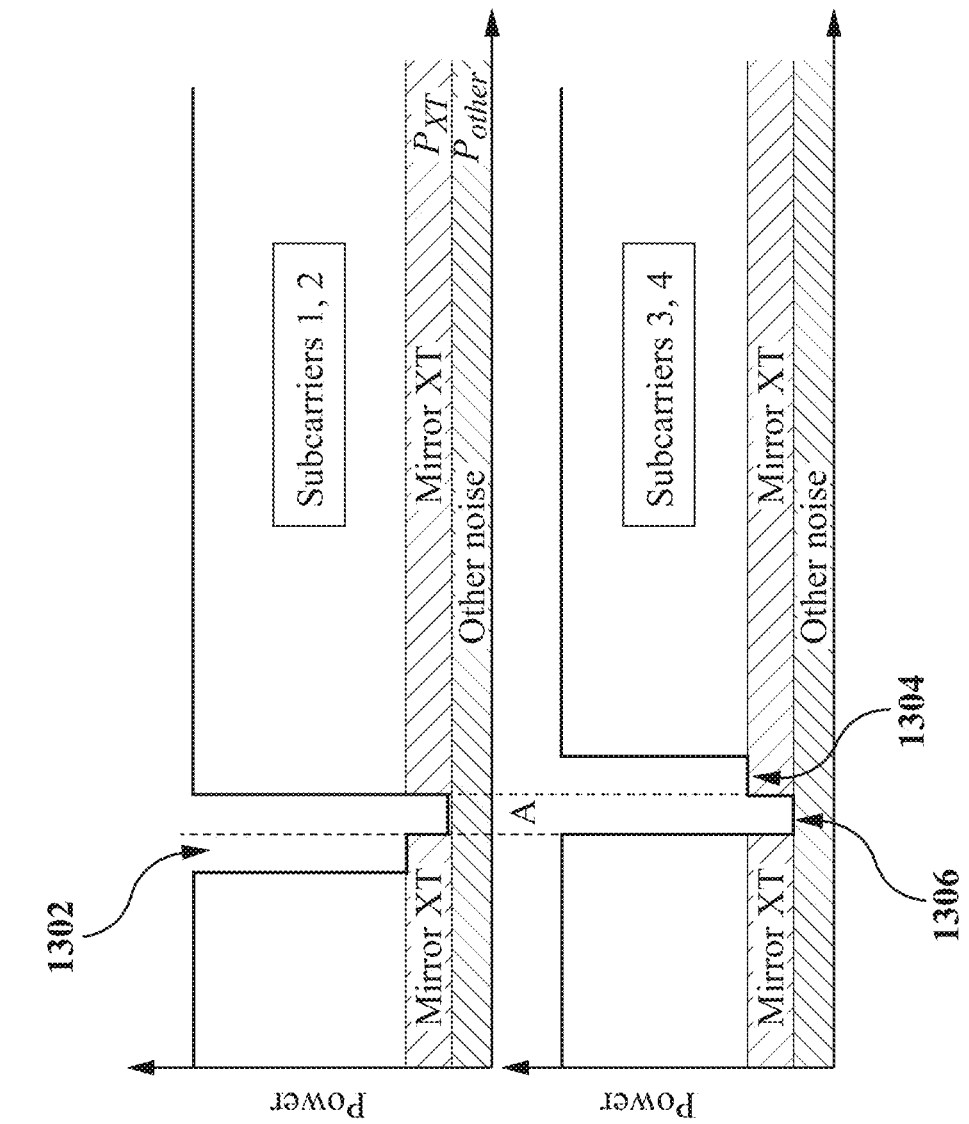
FIG. 13 illustrates an example of a power waveform of a received waveform having four subcarriers modulated with 16 QAM, in accordance with various non-limiting embodiments of the present disclosure.

FIG. 13 illustrates an example 1300 of power waveform of received waveform four subcarriers with 16 QAM, in accordance with various non-limiting embodiments of the present disclosure. As shown, the power in the gap 1302 and 1304 may include mirror crosstalk component and channel noise component. Also, the power in the gap 1306 may include channel noise component in the subcarriers 1 to 4. The mirror crosstalk in the subcarriers 1 and 2 may be computed by subtracting power in the gap 1306 from the power in the gap 1302. Similarly, the mirror crosstalk in the subcarriers 3 and 4 may be computed by subtracting power in the gap 1306 from the power in the gap 1304.

Figure 14:
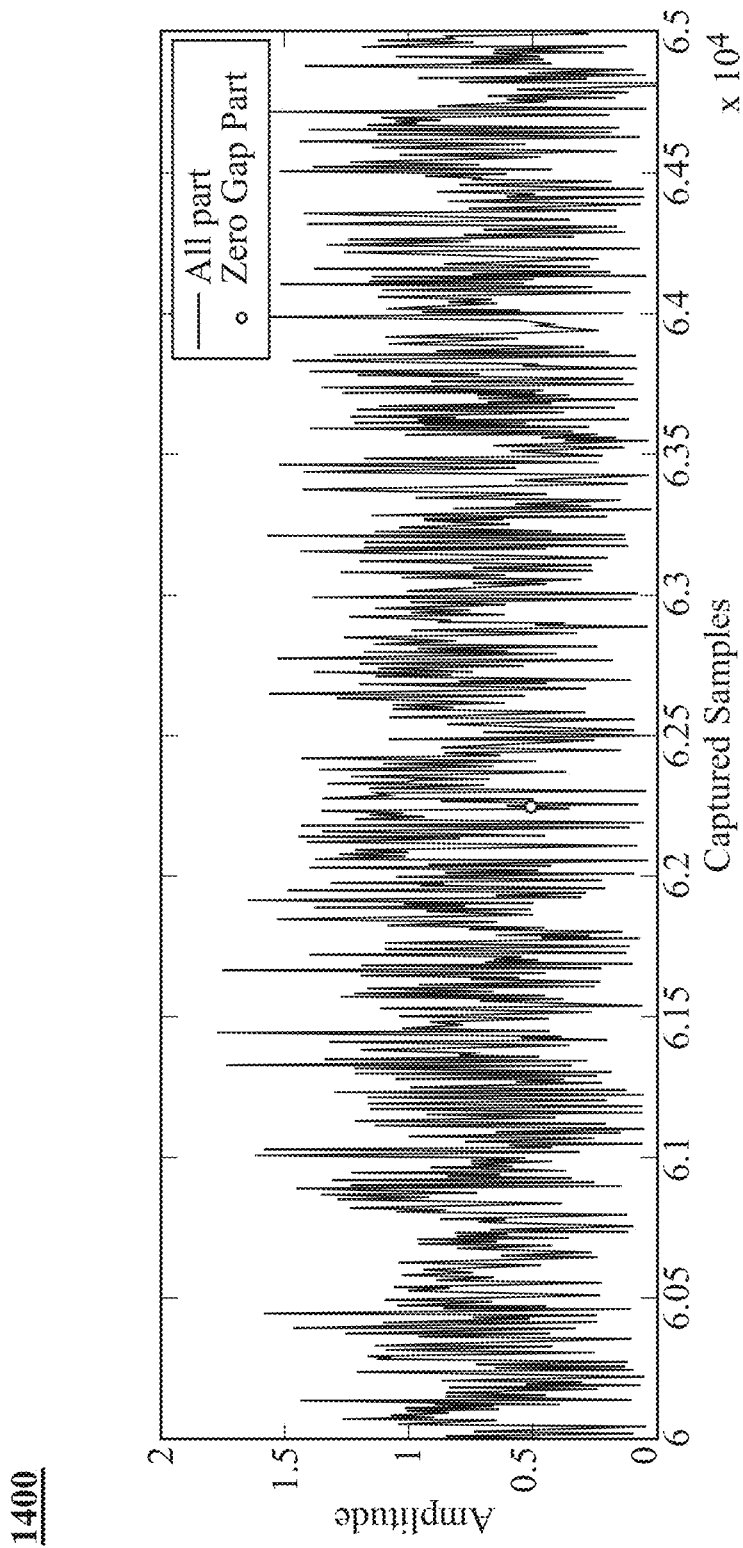
FIG. 14 illustrates an outcome of a data symbol stream without zero-gap insertion, in accordance with various non-limiting embodiments of the present disclosure.
Figure 15:
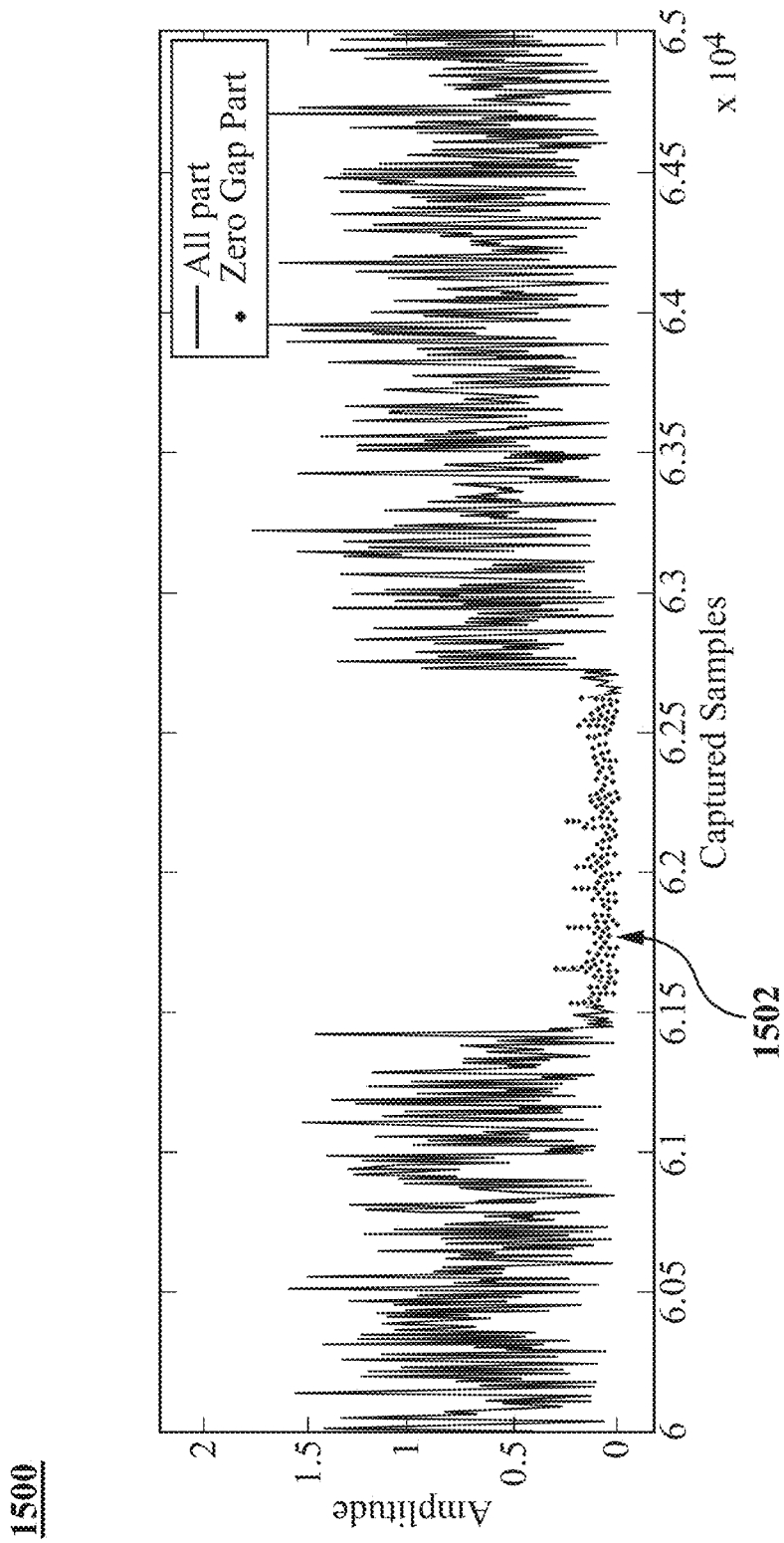
FIG. 15 illustrates an outcome of a data symbol stream with zero-gap insertion, in accordance with various non-limiting embodiments of the present disclosure.

FIG. 14 illustrates an outcome 1400 of a data symbol stream without zero-gap insertion, in accordance with various non-limiting embodiments of the present disclosure. FIG. 15 illustrates an outcome 1500 of a data symbol stream with zero-gap insertion, in accordance with various non-limiting embodiments of the present disclosure. As shown, the samples 1502 where zero-amplitude was previously inserted by the transmitter 600 has some amplitude. The amplitude may be a result of mirror crosstalk and channel noise.

In order to improve the monitoring accuracy, the computed mirror crosstalk may be averaged over time. It should be noted that, for this averaging, the time period during which symbols were allocated zero amplitude may not need to be consecutively long. Since the variation of mirror crosstalk is substantially slow as compared to data/frame rate, multiple data of power measured in several time period at different timing may be collected. This data may be saved in memory elements and be used for averaging process.

Various techniques discussed in the present disclosure provide real time monitoring capability of mirror crosstalk without interrupting traffic. Also, the mirror crosstalk may be monitored without any significant additional hardware.

Various techniques discussed in the present disclosure provide the monitoring capability that enables to isolate the mirror crosstalk from the channel noise. This functionality ensures reliable monitoring capability regardless of signal's condition such as optical signal-to-noise ratio (OSNR).

FIG. 16 depicts a flowchart of a process 1600 representing a method for transmission, in accordance with various non-limiting embodiments of the present disclosure. As shown, the process 1600 commences at step 1602 where a transmitter framer inserts corresponding non-data symbols to each of N data symbol streams, wherein N is an integer value. As previously noted, the transmitter framer 606 may insert corresponding non-data symbols to each of the N data symbol streams.

The process 1600 proceeds to step 1604 where a zero-gap inserter assigns a zero amplitude to at least a portion of the corresponding non-data symbols of at least one of the N data symbol streams. As discussed previously, the zero-gap inserter 608 may assign zero amplitude to at least a portion of the corresponding non-data symbols (few consecutive symbols e.g., around 10 symbols) of at least one the N data symbol streams.

The process 1600 advances to step 1606 where a multiplexer multiplexes the N data symbols to generate a multiplexed data bearing signal. As noted previously, the Multiplexer 614 may multiplex the N frequency domain data bearing sub-bands and generate a multiplexed frequency domain data bearing signal.

Finally, the process 1600 proceeds to step 1608, where a digital-to-analog converter (DAC) converts the multiplexed data bearing signal into an analog data bearing signal to be transmitted over a communication channel. As discussed above, the DAC 620 may convert the multiplexed data bearing signals to the analog data bearing signals to be transmitted over the communication channel.

FIG. 17 depicts a flowchart of a process 1700 representing a method for reception, in accordance with various non-limiting embodiments of the present disclosure. The process 1700 commences at step 1702 where the analog-to-digital converter (ADC) converts a received analog data bearing signal to a digital data bearing signal. As noted previously, the ADCs 1208A, 1208B, 1208C, and 1208D may convert the analog data bearing signals to digital data bearing signals (for e.g., In-phase time domain data bearing signals and Quadrature time domain data bearing signals).

The process 1700 proceeds to step 1704 where the processor processes the digital data bearing signal to generate associated N data symbol streams including corresponding non-data symbols, wherein at least a portion of the corresponding non-data symbols include almost zero amplitude symbols, wherein N is an integer value. As noted above, the processor 1212 may process the digital data bearing signals (e.g., combined time domain data bearing signals) to generate associated N frequency domain data bearing sub-bands, where N is an integer value.

The process 1700 advances to step 1706 where the receiver framer detects the corresponding non-data symbols in the N data symbol streams. As previously noted, the receiver framer 1216 may detect the corresponding non-data symbols in the N data symbol streams.

Finally, the process 1700 proceeds to step 1708 where a mirror crosstalk detector determines mirror crosstalk in at least one of the N data symbol streams. As noted above, the mirror crosstalk detector 1222 may detect crosstalk in the N data symbol streams by i) detecting the portion of the corresponding non-data symbols of at least one of the N data symbol streams including the almost zero amplitude, ii) computing a power of the portion of the corresponding non-data symbols including the almost zero amplitude, and iii) evaluating the mirror crosstalk based on the computed power.

It is to be understood that the operations and functionality of the transmitter 600 and the receiver 1200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A transmitter comprising:
   a transmitter framer configured to insert corresponding non-data symbols to each of N data symbol streams, wherein N is an integer value;
   a zero-gap inserter configured to assign zero amplitude to at least a portion of the corresponding non-data symbols of at least one of the N data symbol streams;
   a multiplexer configured to multiplex the N data symbol streams and generate a multiplexed data bearing signal; and a digital-to-analog converter (DAC) configured to convert the multiplexed data bearing signal into an analog data bearing signal to be transmitted over a communication channel.

2. The transmitter of claim 1, further comprising:
an encoder configured to encode N data bit streams and generate N encoded data bit streams; and
a bit mapper configured to map the N encoded data bit streams into the N data symbol streams.

3. The transmitter of claim 1 further comprising:
a Fast Fourier Transformation (FFT) converter configured to convert the N data symbol streams to frequency domain and generate N frequency domain data bearing sub-bands;
the multiplexer further configured to multiplex the N frequency domain data bearing sub-bands and generate a multiplexed frequency domain data bearing signal;
an inverse FFT (IFFT) converter configured to convert the multiplexed frequency domain data bearing signal into an In-phase time domain bearing signal and a Quadrature time domain data bearing signal; and
the DAC further configured to convert the In-phase time domain bearing signal and the Quadrature time domain data bearing signal into a second analog data bearing signal to be transmitted over the communication channel.

4. The transmitter of claim 1, wherein:
the zero-gap inserter is further configured to assign zero amplitude to at least a portion of the corresponding non-data symbols of at least two of the N data symbol streams; and
frequency domain data bearing sub-bands associated with the at least two of the N data symbol streams are symmetrically distributed around a center frequency of a bandwidth of N frequency domain data bearing sub-bands associated with the N data symbol streams.

5. The transmitter of claim 1, wherein the transmitter framer is further configured to insert the non-data symbols at same time in the N data symbol streams.

6. The transmitter of claim 1, wherein the zero-gap inserter is further configured to assign zero amplitude to at least a portion of the corresponding non-data symbols of each of the N data symbol streams such that a timing of the portion of the corresponding non-data symbols of N/2 data symbol streams having zero amplitude partially overlaps with a timing of the portion of the corresponding non-data symbols of remaining N/2 data symbols.

7. The transmitter of claim 1 further comprising an electrical to optical converter configured to convert the analog data bearing signals to optical data bearing signals and transmit the optical data bearing signals on optical fibers.

8. The transmitter of claim 1, wherein the communication channel is an optical communication channel.

9. The transmitter of claim 1, wherein the communication channel is a wireless communication channel.

10. The transmitter of claim 1, wherein the non-data symbols are part of a non-data field inserted in each of the N data symbol streams.

11. A receiver comprising:
an analog-to-digital converter (ADC) configured to convert received analog data bearing signal to a digital data bearing signal;
a processor configured to process the digital data bearing signal and generate associated N data symbol streams including corresponding non-data symbols, wherein at least a portion of the corresponding non-data symbols include almost zero amplitude symbols, wherein N is an integer value;
a receiver framer configured to detect the corresponding non-data symbols in the N data symbol streams; and
a mirror crosstalk detector configured to determine mirror crosstalk in at least one of the N data symbol streams by:
detecting the portion of the corresponding non-data symbols of at least one of the N data symbol streams including the almost zero amplitude;
computing a power of the portion of the corresponding non-data symbols including the almost zero amplitude; and
evaluating the mirror crosstalk based on the computed power.

12. The receiver of claim 11, wherein:
at least a portion of the corresponding non-data symbols of at least two of the N data symbol streams include almost zero amplitude symbols, such that:
frequency domain data bearing sub-bands associated with the at least two of the N data symbol streams are located symmetrically distributed around a center frequency of a bandwidth of the N frequency domain data bearing sub-bands associated with the N data symbol streams, and
a timing of the portion of the corresponding non-data symbols of a first data symbol stream of the N data symbol streams having almost zero amplitude partially overlaps with a timing of the portion of the corresponding non-data symbols of a second data symbol stream of the N data symbol streams having almost zero amplitude.

13. The receiver of claim 12, wherein determining the mirror crosstalk further comprises:
detecting the portion of the corresponding non-data symbols of the first data symbol stream having the almost zero amplitude;
computing a first power of the portion of the corresponding non-data symbols of the first data symbol stream having the almost zero amplitude;
detecting the portion of the corresponding non-data symbols of the first data symbol stream having the almost zero amplitude that overlaps with the portion of the corresponding non-data symbols of the second data symbol stream having the almost zero amplitude;
computing a second power of the portion of the corresponding non-data symbols of the first data symbol stream having the almost zero amplitude that overlaps with the portion of the corresponding non-data symbols of the second data symbol stream having the almost zero amplitude; and
computing a difference between the first power and the second power, the difference representing the mirror crosstalk.

14. The receiver of claim 11, wherein the mirror crosstalk is the computed power.

15. A method for transmission comprising:
inserting, by a transmitter framer, corresponding non-data symbols to each of N data symbol streams, wherein N is an integer value;
assigning, by a zero-gap inserter, zero amplitude to at least a portion of the corresponding non-data symbols of at least one of the N data symbol streams;
multiplexing, by a multiplexer, the N data symbol streams to generate a multiplexed data bearing signal; and converting, by a digital-to-analog converter (DAC) the multiplexed data bearing signal into an analog data bearing signal to be transmitted over a communication channel.

16. The method of claim 15, further comprising:
encoding, by an encoder, N data bit streams to generate N encoded data bit streams; and
mapping, by a bit mapper, the N encoded data bit streams into the N data symbol streams.

17. The method of claim 15, further comprising:
converting, by a Fast Fourier Transformation (FFT) converter, the N data symbol streams to frequency domain to generate N frequency domain data bearing sub-bands;
multiplexing, by the multiplexer, the N frequency domain data bearing sub-bands to generate a multiplexed frequency domain data bearing signal;
converting, by an inverse FFT (IFFT), the multiplexed frequency domain data bearing signal into an In-phase time domain bearing signal and a Quadrature time domain data bearing signal; and
converting, by the DAC the In-phase time domain bearing signal and the Quadrature time domain data bearing signal into a second analog data bearing signal to be transmitted over the communication channel.

18. The method of claim 15, further comprising:
assigning, by the zero-gap inserter, zero amplitude to at least a portion of the corresponding non-data symbols of at least two of the N data symbol streams, wherein frequency domain data bearing sub-bands associated with the at least two of the N data symbol streams are symmetrically distributed around a center frequency of a bandwidth of N frequency domain data bearing sub-bands associated with the N data symbol streams.

19. The method of claim 15, further comprising:
assigning, by the zero-gap inserter, zero amplitude to at least a portion of the corresponding non-data symbols of each of the N data symbol streams such that a timing of the portion of the corresponding non-data symbols of N/2 data symbol streams having zero amplitude partially overlaps with a timing of the portion of the corresponding non-data symbols of remaining N/2 data symbols.

20. The method of claim 15, further comprising:
converting, by an electrical to optical converter, the analog data bearing signals to optical data bearing signals and transmitting the optical data bearing signals to optical fibers.

21. A method for reception comprising:
converting, by an analog-to-digital converter (ADC), a received analog data bearing signal to a digital data bearing signal;
processing, by a processor, the digital data bearing signal to generate associated N data symbol streams including corresponding non-data symbols, wherein at least a portion of the corresponding non-data symbols include almost zero amplitude symbols, wherein N is an integer value;
detecting, by a receiver framer, the corresponding non-data symbols in the N data symbol streams; and
determining, by a mirror crosstalk detector, mirror crosstalk in at least one of the N data symbol streams by:
detecting the portion of the corresponding non-data symbols of at least one of the N data symbol streams including the almost zero amplitude;
computing a power of the portion of the corresponding non-data symbols including the almost zero amplitude; and
evaluating the mirror crosstalk based on the computed power.

22. The method of claim 21, wherein:
at least a portion of the corresponding non-data symbols of at least two of the N data symbol streams include almost zero amplitude symbols, such that:
frequency domain data bearing sub-bands associated with the at least two of the N data symbol streams are located symmetrically distributed around a center frequency of a bandwidth of the N frequency domain data bearing sub-bands associated with the N data symbol streams, and
a timing of the portion of the corresponding non-data symbols of a first data symbol stream of the N data symbol streams having almost zero amplitude partially overlaps with a timing of the portion of the corresponding non-data symbols of a second data symbol stream of the N data symbol streams having almost zero amplitude.

23. The method of claim 21, wherein determining, by the mirror crosstalk detector, the mirror crosstalk further comprises:
detecting the portion of the corresponding non-data symbols of the first data symbol stream having the almost zero amplitude;
computing a first power of the portion of the corresponding non-data symbols of the first data symbol stream having the almost zero amplitude;
detecting the portion of the corresponding non-data symbols of the first data symbol stream having the almost zero amplitude that overlaps with the portion of the corresponding non-data symbols of the second data symbol stream having the almost zero amplitude;
computing a second power of the portion of the corresponding non-data symbols of the first data symbol stream having the almost zero amplitude that overlaps with the portion of the corresponding non-data symbols of the second data symbol stream having the almost zero amplitude; and
computing a difference between the first power and the second power, the difference representing the mirror crosstalk.

24. The method of claim 21, wherein the mirror crosstalk is the computed power.

* * * * *